US012774735B2

(12) United States Patent
Zimmer

(10) Patent No.: US 12,774,735 B2
(45) **Date of Patent: *Oct. 27, 2026**

(54) MULTI COMPONENT IDLER OR PULLEY FOR A BELT SYSTEM

(71) Applicant: ZPE LICENSING INC., Temecula, CA (US)

(72) Inventor: Andrew Jason Zimmer, Temecula, CA (US)

(73) Assignee: ZPE LICENSING INC., Temecula, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 18/918,689

(22) Filed: Oct. 17, 2024

(65) Prior Publication Data

US 2025/0035193 A1 Jan. 30, 2025

Related U.S. Application Data

(63) Continuation of application No. 18/173,205, filed on Feb. 23, 2023, now Pat. No. 12,146,572.

(Continued)

(51) Int. Cl.

| | |
|---|---|
| ***F16H 55/36*** | (2006.01) |
| ***F16H 7/12*** | (2006.01) |
| ***F16H 55/56*** | (2006.01) |

(52) U.S. Cl.

CPC ............... *F16H 7/12* (2013.01); *F16H 55/36* (2013.01); *F16H 55/56* (2013.01)

(58) Field of Classification Search

CPC . F16H 7/12; F16H 55/36; F16H 55/56; F16H 7/08; F16H 55/52; F16H 55/566; F16H 9/24

(Continued)

(56) References Cited

U.S. PATENT DOCUMENTS

| | | |
|---|---|---|
| 2,182,774 A | 12/1939 | Birnbaum |
| 2,184,545 A | 12/1939 | Collier |

(Continued)

FOREIGN PATENT DOCUMENTS

| | | | | |
|---|---|---|---|---|
| EP | 1754914 A1 * | 2/2007 | ............. | F16H 55/36 |
| WO | WO-2012125882 A2 * | 9/2012 | ............. | F16D 13/28 |

OTHER PUBLICATIONS

VMP Tuning, http://vmptuning.com/tools/3inclam/, [Published as early as Mar. 14, 2014].

(Continued)

*Primary Examiner* — Anna M Momper
*Assistant Examiner* — Katelynne R Burrell
(74) *Attorney, Agent, or Firm* — DANE IP Law PC

(57) ABSTRACT

A multi-component idler or pulley that may be used with a belt and pulley system of an automobile is disclosed. The multi-component idler may have an external idler housing coupled to a mounting hub that is designed to be connected to a mounting surface of the belt and pulley system. The axial position of the external idler housing may be adjustable relative to the mounting hub using a threaded engagement or a plurality of shims between the components. The external idler housing and the mounting hub may be fastened to each other by bolts once their positions are adjusted relative to each other. Different types of external idler housing may also be used with the mounting hub. In this way, the serpentine belt of the belt and pulley system may be adjusted based on the user's needs.

12 Claims, 16 Drawing Sheets

Related U.S. Application Data

(60) Provisional application No. 63/316,842, filed on Mar. 4, 2022.

(58) Field of Classification Search
USPC .......................................................... 474/101
See application file for complete search history.

(56) References Cited

U.S. PATENT DOCUMENTS

| | | | | | |
|---|---|---|---|---|---|
| 2,245,695 | A * | 6/1941 | Mantle | F16H 55/566 474/43 |
| 2,413,817 | A | 1/1947 | Firth | |
| 2,555,189 | A * | 5/1951 | Theodor | F16H 55/566 474/42 |
| 2,577,516 | A * | 12/1951 | Firth | F16H 55/566 474/42 |
| 2,609,699 | A | 9/1952 | Rohn | |
| 2,643,549 | A | 6/1953 | Whitesell | |
| 2,836,982 | A | 6/1958 | Voss | |
| 2,855,787 | A * | 10/1958 | Kumro | F16H 55/566 474/33 |
| 2,890,592 | A * | 6/1959 | Keepers | F16H 55/566 474/33 |
| 3,264,891 | A | 8/1966 | Hovorka | |
| 3,604,280 | A | 9/1971 | Davis | |
| 3,666,613 | A | 5/1972 | Beninga | |
| 3,776,059 | A | 12/1973 | Habermann | |
| 3,958,063 | A | 5/1976 | Robson | |
| 4,226,133 | A * | 10/1980 | Hanke | F16H 55/566 474/42 |
| 4,254,541 | A | 3/1981 | St John | |
| 4,364,736 | A | 12/1982 | Hetz | |
| 4,504,249 | A * | 3/1985 | Fortier | F16H 55/566 474/33 |
| 4,548,592 | A | 10/1985 | Ohhashi | |
| 4,612,208 | A | 9/1986 | Reichenecker | |
| 4,781,660 | A | 11/1988 | Amataka | |
| 4,826,412 | A | 5/1989 | Kubo | |
| 4,838,842 | A | 6/1989 | Ohkata | |
| 4,913,689 | A | 4/1990 | Morishita | |
| 5,106,672 | A | 4/1992 | Rabe | |
| 5,289,813 | A | 3/1994 | Adachi | |
| 5,304,098 | A * | 4/1994 | Smith | F16H 55/566 474/36 |
| 5,454,760 | A | 10/1995 | Aranibar | |
| 5,507,698 | A | 4/1996 | Kuribayashi | |
| 5,593,366 | A | 1/1997 | Puzik | |
| 6,572,270 | B2 | 6/2003 | Hiromichi | |
| 6,676,548 | B2 | 1/2004 | Fujiwara | |
| 7,244,185 | B2 | 7/2007 | Kamdem | |
| 7,297,081 | B2 | 11/2007 | Eck | |
| 7,448,972 | B2 | 11/2008 | Garabello | |
| D662,046 | S | 6/2012 | Unger | |
| 8,308,590 | B2 | 11/2012 | Fiordaliso | |
| 9,261,184 | B2 | 2/2016 | Ogushi | |
| 9,421,637 | B2 | 8/2016 | Zimmer | |
| 9,541,185 | B2 * | 1/2017 | Albrecht | F16H 55/36 |
| 12,146,572 | B2 * | 11/2024 | Zimmer | F16H 55/36 |
| 12,209,649 | B2 * | 1/2025 | Zimmer | B23K 26/60 |
| 2005/0148417 | A1 | 7/2005 | Garabello | |
| 2006/0142102 | A1 | 6/2006 | Radocaj | |

OTHER PUBLICATIONS

VMP Tuning, http://vmptuning.com/pulley-tools/vmpalltool/, [Published as early as Mar. 14, 2014].
Steeda Autosports, http://www.steeda.com/steeda-gt500-supercharger-pulley-puller-555-8902/, [Published as early as Mar. 14, 2014].

* cited by examiner

MULTI COMPONENT IDLER OR PULLEY FOR A BELT SYSTEM

CROSS-REFERENCE TO RELATED APPLICATIONS

This application is a continuation application of U.S. patent application Ser. No. 18/173,205, filed on Feb. 23, 2023, which claims priority to Prov. Pat. App. Ser. No. 63/316,842, filed on Mar. 4, 2022, the entire contents of which are expressly incorporated herein by reference.

STATEMENT RE: FEDERALLY SPONSORED RESEARCH/DEVELOPMENT

Not Applicable

BACKGROUND

The various aspects and embodiments described herein relate to a multi-component idler or pulley and a method of using thereof.

A belt and pulley used in an automobile engine may need to be switched out and replaced with a different size. However, in doing so, the user may have to match the belt with the idler. Such matching may be difficult to accomplish.

Accordingly, there is a need in the art for an improved device, system, and method for assisting in changing a belt and pulley used in an automobile.

BRIEF SUMMARY

The various embodiments and aspects disclosed herein address the needs discussed above, discussed below and those that are known in the art.

A multi-component idler or pulley used with a belt and pulley system of an automobile engine is disclosed. The multi-component idler may have an external idler housing coupled to a mounting hub that is designed to be connected to a mounting surface of the belt and pulley system. The axial position of the external idler housing may be adjustable relative to the mounting hub using a threaded engagement or a plurality of shims between the components. The external idler housing may be rotated inwards or outwards using the threaded engagement with the mounting hub when adjusting its axial position. The mounting hub may have a protruding boss designed to allow a user to measure the change in axial position of the idler housing when rotated relative to the mounting hub. Alternatively, one or more shims with different thicknesses may be used instead of the threaded engagement when adjusting the axial position of the idler housing relative to the mounting hub.

The external idler housing and the mounting hub may be fastened to each other by bolts once their positions are adjusted relative to each other. Different types of external idler housings, with different dimensions and features, may also be used with the mounting hub to accommodate different requirements of the belt and pulley system. In this way, the serpentine belt of the belt and pulley system may be adjusted based on the user's needs.

More particularly, an adjustable idler for tuning a belt system of an automobile is disclosed. The adjustable idler may comprise a mounting hub attachable to a shaft of the belt system. The mounting hub may have a face perpendicular to a central axis of the mounting hub. The mounting hub may have a plurality of threaded holes in a radial array about the central axis of the mounting hub. The adjustable idler may further comprise an external idler housing adjustably fixable to the mounting hub. The external idler housing may have a face perpendicular to a rotational axis of the external idler housing. The external idler housing may have a plurality of apertures that are alignable to the plurality of threaded holes formed on the face of the mounting hub. The adjustable idler may further comprise a plurality of bolts that are insertable through the plurality of apertures of the idler housing and engagable to the plurality of threaded holes of the mounting hub to fix the idler housing to the mounting hub. The external idler housing may be positionable along an axial position of the mounting hub.

In some embodiments of the adjustable idler, an external cylindrical surface of the mounting hub may have threads and an internal cylindrical surface of the external idler housing may have threads for threadable engagement with the threads of the mounting hub so that rotation of the external idler housing changes the axial position of the external idler housing on the mounting hub at a rate equal to a pitch of the threads of the mounting hub and the external idler housing.

In some embodiments of the adjustable idler, each of the plurality of bolts may be equidistantly spread apart from each other.

In some embodiments of the adjustable idler, the plurality of bolts may be balanced about the rotational axis of the idler housing.

In some embodiments of the adjustable idler, the plurality of apertures in the face of the idler housing may be aligned to plurality of threaded holes of the mounting hub in two rotational positions less than 360.

In some embodiments of the adjustable idler, the mounting hub may be housed within an internal surface cavity of the external idler housing.

In some embodiments of the adjustable idler, a plurality of shims may be incorporated, each shim defining a thickness, at least one shim being disposable between the face of the mounting hub and the face of the external idler housing for shifting the external idler housing away from the mounting hub equal to a distance of the thickness of the at least one shim disposed between the face of the mounting hub and the face of the idler housing.

In some embodiments of the adjustable idler, each of the shims may have a different thickness.

In some embodiments of the adjustable idler, two or more shims may be stacked upon each other and disposed between the face of the mounting hub and the face of the idler housing for shifting the idler housing away from the mounting hub equal to a distance of a sum of the thicknesses of the stacked shims.

Additionally, a method of adjusting an axial position of an idler mounted to a shaft of an automobile is disclosed. The method may comprise steps of attaching a mounting hub to the shaft, setting an axial position of an idler housing over the mounting hub, and fixedly attaching the idler housing to the mounting hub to fix the previously set axial position of the idler housing to the mounting hub.

In some embodiments of the method, the setting step may comprise engaging threads of the idler housing to threads of the mounting hub until the idler housing has reached a desired axial position on the mounting hub.

In some embodiments of the method, the setting step may comprise disposing a shim between a face of the idler housing and a face of the mounting hub to axially position the idler housing to the mounting hub.

In some embodiments of the method, the fixedly attaching step may comprise a step of bolting the idler housing to the mounting hub.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
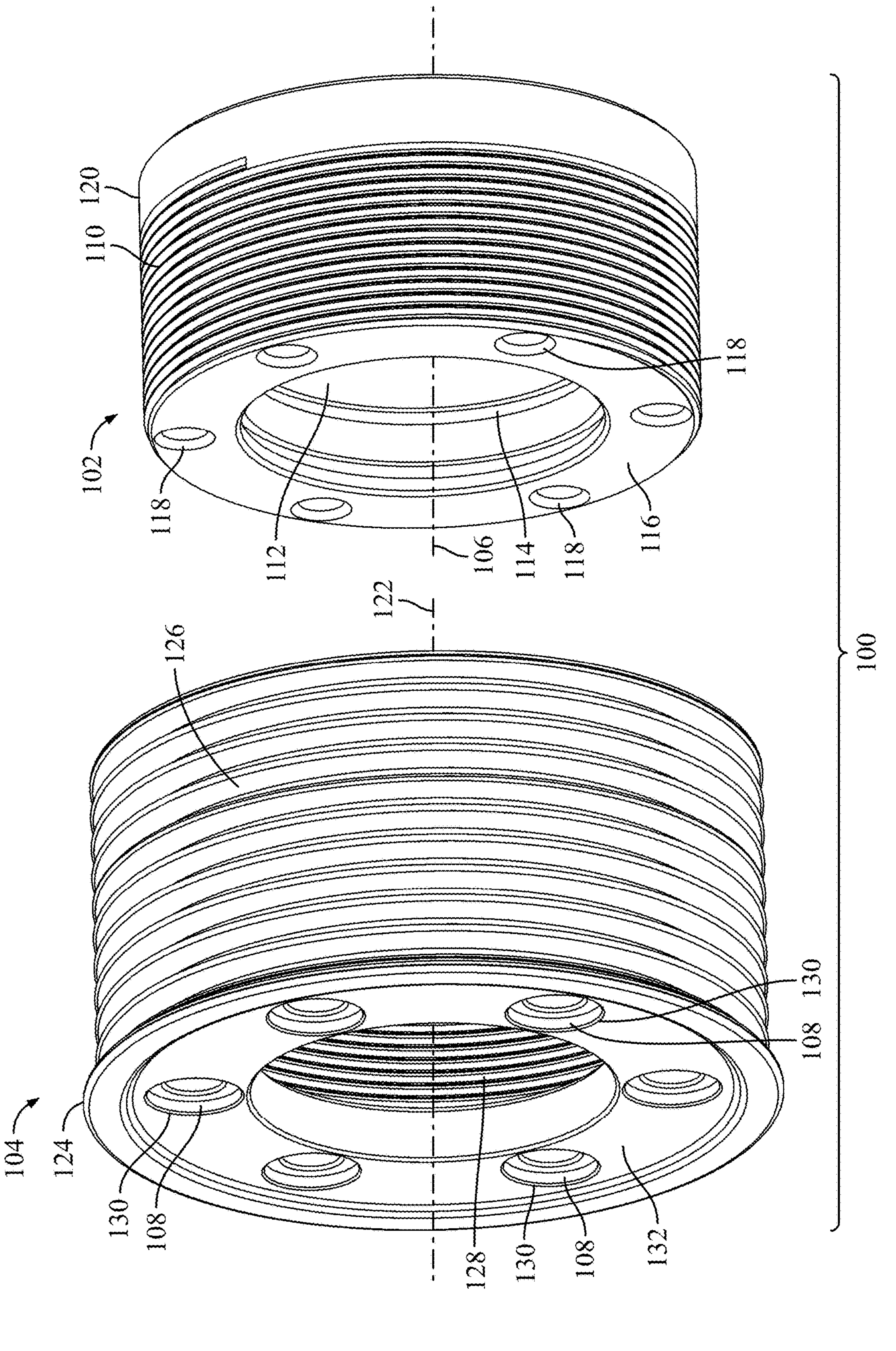
FIG. 1 shows an exploded perspective view of the multi-component idler with the two main components separated from each other.

Referring now to the drawings, a multi-component idler 100 used in a belt and pulley system of an automobile engine and having two main components, an external idler housing 104 and a mounting hub 102, is disclosed. The idler housing 104 may be mounted to the mounting hub 102, and the mounting hub 102 may be attached and fastened to a mounting surface of the belt and pulley system on the automobile engine. The axial position of the external idler housing 104 may be adjusted inwards or outwards relative to the mounting hub 102 to create a separation distance 302 (see FIG. 3) between the two components. The separation distance 302 may determine the position of the external idler housing 104 and where the belt would be mounted on the multi-component idler 100. The axial position of the idler housing 104 may be adjusted inwards or outwards by rotating the idler housing 104 using a threaded engagement with the mounting hub 102. The mounting hub 102 may have a measurement component, such as a protruding boss 404 (see FIG. 4) that may be used in measuring the separation distance 302 when adjusting the idler housing 104 relative to the mounting hub 102. Alternatively, one or more of circular shims 1002*a-c* (see FIG. 10) may be used to increase or decrease the separation distance 1102 (see FIG. 11) and increase or decrease the axial position of the idler housing 104 relative to the mounting housing 102, as shown in FIG. 11. When using shims to increase or decrease the axial position of the idler housing 104, a threaded engagement between the two components may not be needed, but could be used. The multi-component idler 100, or the idler housing 104 itself, may come in different sizes, dimensions, and have varying features, as described herein. Many different idler housings 104 maybe attached to one mounting hub 102. To change out the multi-component idler 100, only the idler housing 104 may be changed out, and the position of the idler housing 104 may be adjusted via threaded engagement or shims. Consequently, the risk of damaging the bearings of the idler pulley may be minimized since the bearing would be inside the mounting hub 102 and the idler housing 104 of the multi-component idler 100 is only being changed.

The multi-component idler 100 described herein allows for more customization for the belt and pulley system based on the features described herein. The user may adjust or conform to the parameters of the belt and pulley system of the automobile engine using the multi-component idler 100, such as adjusting the positioning and orientation of the serpentine belt mounted on the multi-component idler 100. Additionally, the user may change the type of serpentine belt used in the belt and pulley system without needing to change the whole idler pulley, but rather just changing the type of external idler housing 104 coupled to the mounting hub 102. Although this disclosure describes the idler housing 104 being adjusted relative to the mounting hub 102, the vice versa may also be possible. Although the multi-component idler 100 is being referenced for usage with an idler of a belt and pulley system of an automobile engine, the multi-component idler 100 may apply to other types of pulleys, such as a supercharger pulley of an automobile or other types of mechanisms, machines and systems.

Referring specifically now to FIG. 1, an exploded perspective view of the multi-component idler 100 with the two main parts separated from each other is shown. The first main component may be the mounting hub 102 and the second main component may be the external idler housing 104. As seen in the next figures, the idler housing 104 may be adjustably coupled to the mounting hub 102 to provide for more customization of the positioning and orientation of the multi-component idler pulley 100.

The mounting hub 102 may be cylindrical with a hollow center about a central axis 106. The mounting hub 102 may be configured to be attached to the belt and pulley system or be mounted on an idler shaft of the belt and pulley system. As such, the mounting hub 102 may revolve around the central axis 106.

Figure 6:
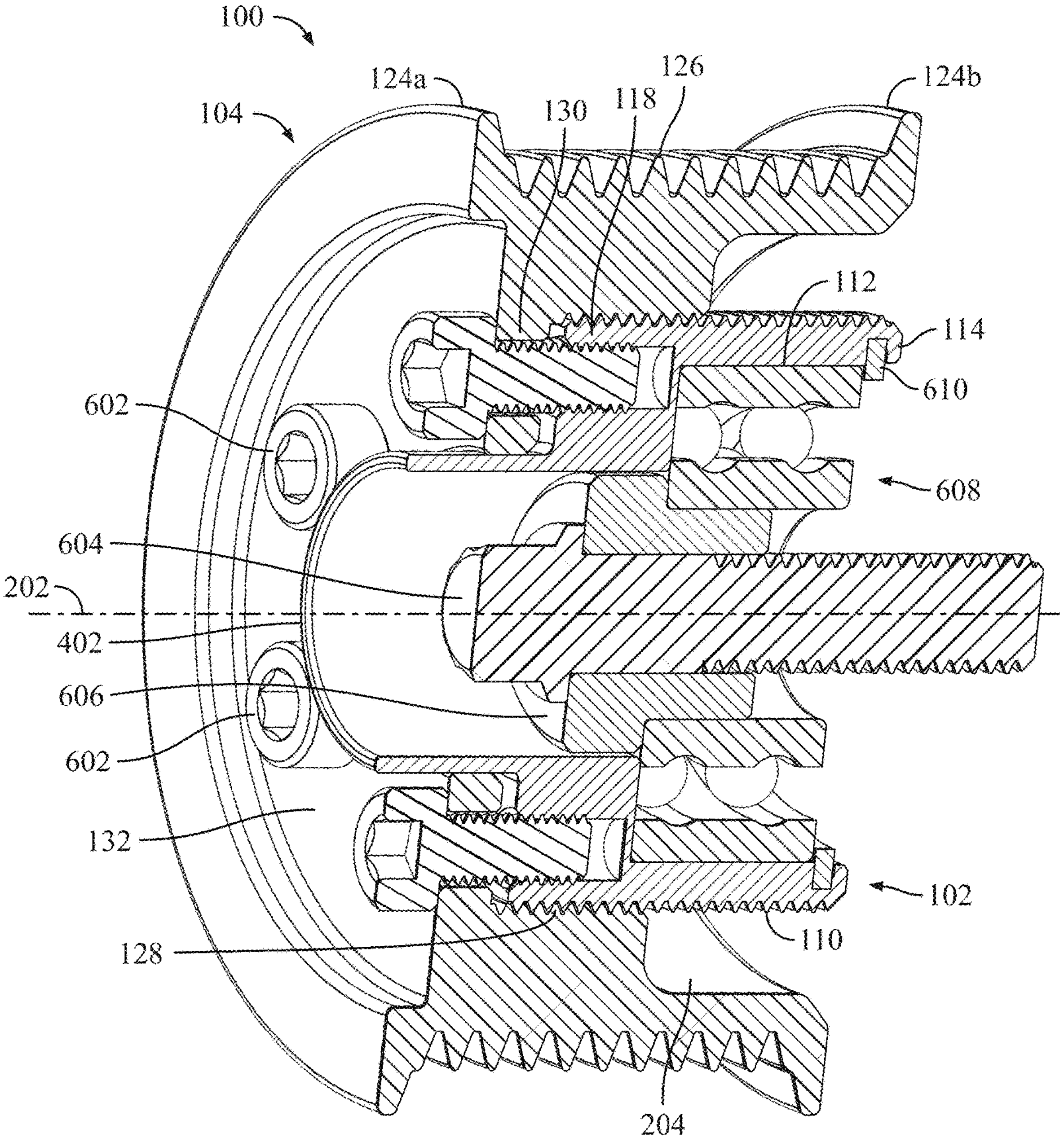
FIG. 6 shows a perspective cross-sectional view of the multi-component idler having a threaded engagement between the two main components with bolts and a bearing implemented.

The cylindrical body of the mounting hub 102 may have an inner surface 112, an outer surface, and a front face 116 with threaded holes 118. As shown in FIG. 6, the inner surface 112 of the mounting hub 102 may hold the bearing 608 used for the rotation of the multi-component idler 100. The inner surface 112 of the mounting hub 102 may have one or more grooves 114 to receive scaling components 610 to keep the bearing 608 in place. The outer surface of the mounting hub 102 may be threaded to couple with the external idler housing 104. Specifically, the outer surface of the mounting hub 102 may have a threaded portion 110 and a smooth portion 120, where the threaded portion 110 may be adjacent to the front face 116, and the smooth portion 120 may be adjacent to the other end of the cylindrical body of the mounting hub 102. The threaded portion 110 and the smooth portion 120 may each cover a portion of the length of the mounting hub 102. By way of example and not limitation, the threaded portion 110 may extend along the whole length, the majority of the length, or less than half the length of the longitudinal body of the mounting hub 102. The more that the threaded portion 110 covers the outer surface of the mounting hub 102, the more the external idler housing 104 may be adjusted along the mounting hub 102. The less that the threaded portion 110 covers the outer surface of the mounting hub 102, the less the cost and effort of manufacturing the mounting hub 102 may be.

The front face 116 may have threaded holes 118 in a radial array to align with the apertures 130 of the external idler housing 104 for bolts to fasten the two components together. Such fastening may be done when the idler housing 104 is adjusted axially in a desired position relative to the mounting hub 102. In different examples, the threaded holes 118 may be radially close to the central axis 106 or farther away depending on the size and compactness of the mounting hub 102 and the multi-component idler 100 in general. The threaded holes 118 may be in a radial array distanced away from the central axis 106 such that the threaded holes 118 do not radially overlap with the location of the bearing in the inner surface 112 of the mounting hub 102. Consequently, the threaded holes 118 may extend through the whole length, or a majority of the length, of the mounting hub 102. Alternatively, the threaded holes 118 may be in a radial array distanced near to the central axis 106 such that the threaded holes 118 radially overlap and are positioned in front of the location of the bearing 608 (see FIG. 6) in the inner surface 112. As such, the threaded holes 118 may only extend through a portion of the length of the mounting hub 102 that is in front of where the bearing 608 is located, which may be less than half of the length of the mounting hub 102. By way of example and not limitation, the threaded holes 118 may be symmetrically spaced apart and equidistant from each other and may range between 2-12 holes. The symmetrical placement of the threaded holes 118 allows for stable rotational motion when the multi-component idler pulley 100 is in operation.

Figure 2:
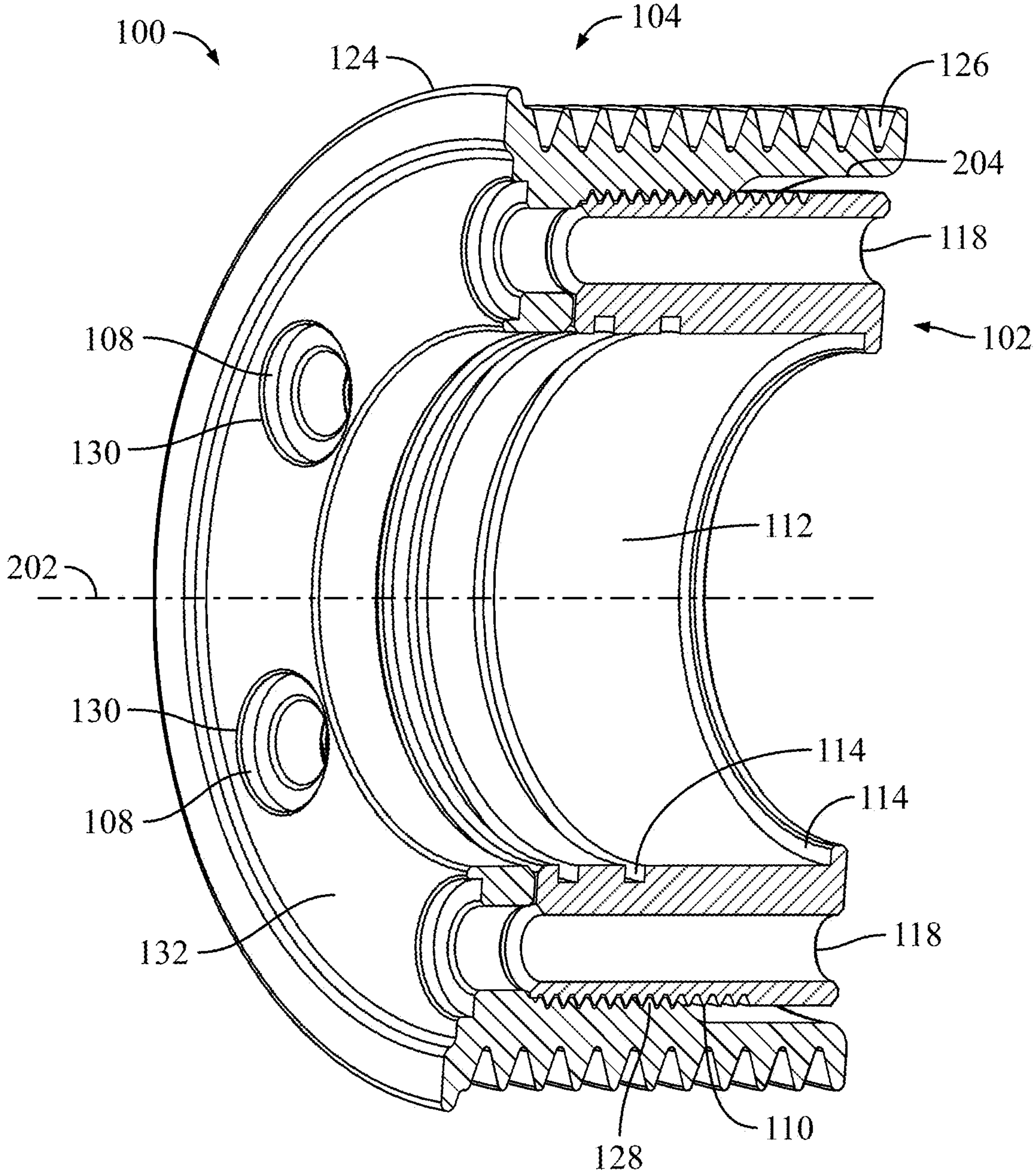
FIG. 2 shows a perspective cross-sectional view of the multi-component idler shown in FIG. 1 with the two main components coupled to each other at a first position.

The external idler housing 104 may be cylindrical with a central cavity about a rotational axis 122. The central cavity may extend from the front housing face 132 to the other end of the cylindrical body of the idler housing 104. The central cavity may allow the idler housing 104 to mount and be coupled to the mounting hub 102 and be axially adjusted at a desired position. When coupled together, the rotational axis 122 of the idler housing 104 may overlap, run parallel, and become the same as the central axis 106 of the mounting hub 102. As shown in FIG. 2, such shared axis may be called the idler axis 202 that runs along the length of the cylindrical body of the multi-component idler pulley 100.

The cylindrical body of the idler housing 104 may have an internal surface, an external surface 126, and a front housing face 132 with apertures 130. The internal surface of the idler housing 104 may have the same, or similar, threading as the outer surface of the mounting hub 102 such that the two components may be rotationally coupled with each other via screwing along the threading. The internal threaded section 128 of the idler housing 104 may run through the full length, the majority of the length, or less than the majority of the length of the idler housing 104, depending on the design requirements of the multi-component idler pulley 100. The longer the internal threaded section 128, the more adjustment options a user may have when coupling the idler housing 104 with the mounting hub 102. The shorter the internal threaded section 128, the less cost and effort may be required in manufacturing the idler housing 104.

The external surface 126 of the idler housing 104 may be where the serpentine belt (not shown) of the belt and pulley mechanism is installed on. The external surface 126 may be ribbed to increase friction between the external idler housing 104 and the serpentine belt. By way of example and not limitations, the external surface 126 may have between 4-16 ribs. Alternatively, the external surface 126 of the idler housing 104 may be smooth, as further explained elsewhere herein. By way of example and not limitation, a ribbed belt, flat belt, or v-belt may be coupled to the external surface 126 of the idler housing 104. Rather than changing the whole idler pulley, the external idler housing 104 may be changed to accommodate different types of serpentine belts used for different functions, such as racing or normal operation of the automobile.

The front housing face 132 may have a plurality of apertures 130 in a radial array that align with the threaded holes 118 of the mounting hub 102 for bolts to fasten the two components together, similar to what is shown in FIG. 6. Similar to what has been described with the threaded holes 118 of the mounting hub 102, the plurality of apertures 130 may be radially close or far away from the rotational axis 122 to align with the threaded holes 118. Such radial position of the apertures 130 may depend on the need for compactness of the multi-component idler pulley 100. By way of example and not limitation, the plurality of apertures 130 may be symmetrically spaced apart and equidistant from each other and may range between 2-12 holes. Such symmetrical orientation may have the same function as described with reference to the threaded holes 118. The plurality of apertures 130 may have indents 108 for the head of the bolts that are inserted through the apertures 130.

The front housing face 132 may have a fence 124 protruding radially outward farther than the ribs of the external surface 126 to prevent the serpentine belt from slipping off the idler housing 104. As shown in FIG. 6, there may exist another fence **124*b* on the other end of the cylindrical body of the idler housing 104. One or more of the fences may be omitted to reduce the length and diameter of the idler housing 104. This may be done if the multi-component idler pulley 100** needs to be installed in a place with scarce spacing because of other pulleys or objects in the near vicinity.

The multi-component idler pulley 100 may come in different sizes to accommodate different positioning and spacing requirements of the belt and pulley system. By way of example and not limitation, the multi-component idler pulley 100 may come in a compact size having an idler-housing outer-diameter of 1.5-2.5 inches, a medium size having an idler-housing outer-diameter of 2.51-3.5 inches, and a large size having an idler-housing outer-diameter of 3.51-6.0 inches. The smaller sized multi-component idler pulleys 100 may be used in places where there is scarce spacing for the idler pulley. The length of the cylindrical body of the multi-component idler pulley 100 may also be shortened and lengthened depending on the amount of spacing available. By way of example and not limitation, the multi-component idler pulley 100 may be made from a metal alloy, such as an aluminum, steel, or titanium alloy, or from a polymer or composite material.

Figure 3:
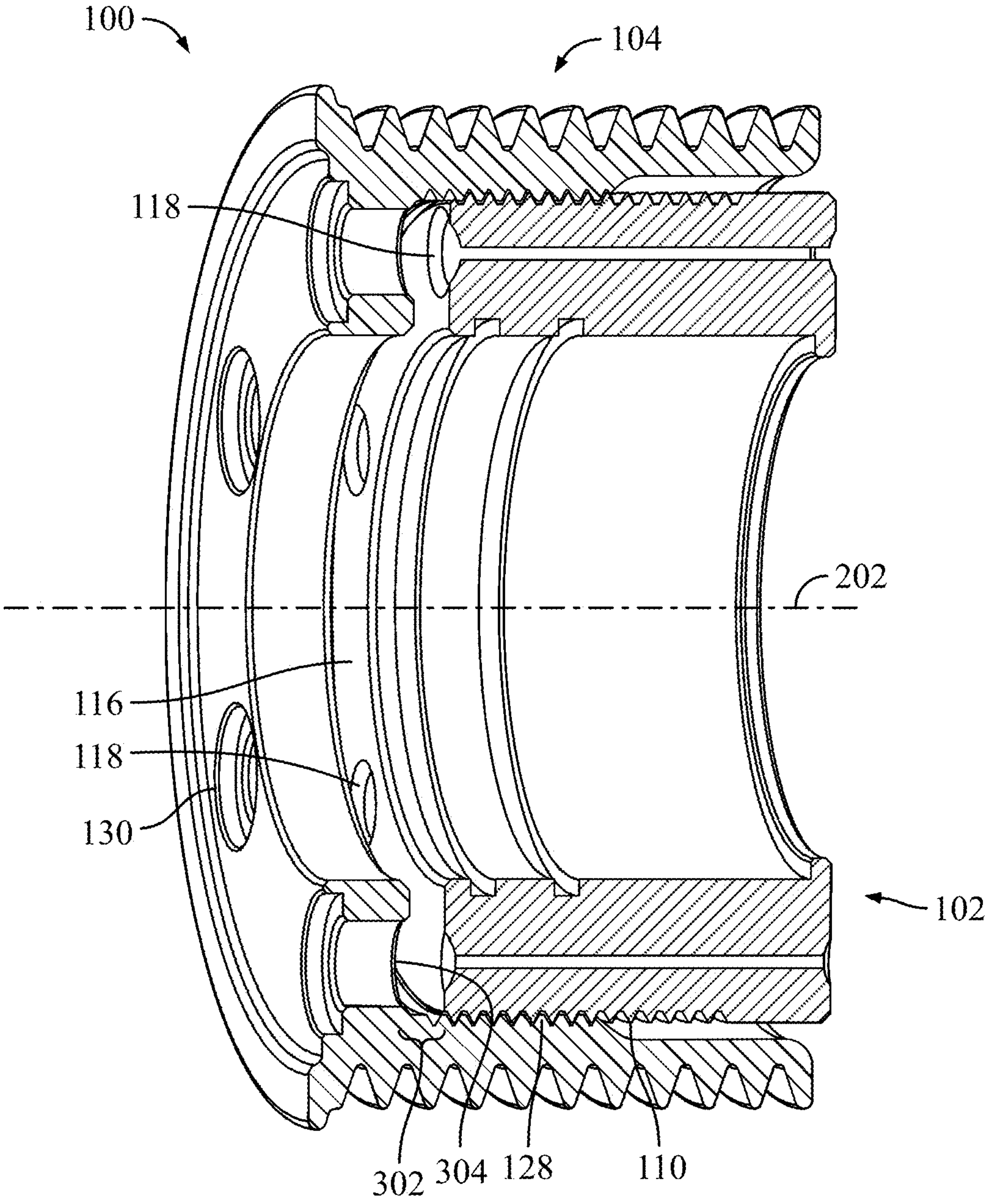
FIG. 3 shows another perspective cross-sectional view of the multi-component idler shown in FIG. 1 with the two main components coupled to each other in a second position.

Referring now to FIG. 2, a perspective cross-sectional view of the multi-component idler 100 with the two main components coupled to each other at a first position is shown. In this position, the external idler housing 104 may be coupled to the mounting hub 102 such that there exists no spacing between the front face 116 and the inner front housing surface 304 (see FIG. 3). The external idler housing 104 may be adjustable along the idler axis 202 by rotating such component outward using the threaded engagement between the idler housing 104 and the mounting hub 102. The idler axis 202 may run along the cylindrical length of the multi-component idler 100 along its center. The coupling and position between the idler housing 104 and the mounting hub 102 may be adjusted by rotating and screwing or unscrewing the idler housing 104 using the internal threaded section 128 of the external idler housing 104 with the threaded portion 110 of the mounting hub 102. In this way, the axial position of the external idler housing 104 may be changed relative to the mounting hub 102 either by increasing or decreasing the separation distance 302, as shown in FIG. 3. Consequently, the position of the external surface 126 of the idler housing 104 and where the serpentine belt would be mounted may be adjusted relative to the rest of the components of the belt and pulley system and the automobile engine. Such adjustment may create the needed positioning and orientation for the serpentine belt to conform with the rest of the pulleys and components of the belt and pulley system. For instance, the position adjustment may create more or less spacing between an engine block and the idler housing 104 so that the operation of the idler pulley does not interfere with other pulleys in the system. Additionally, different kinds of idler housings 104 with different features, dimensions, and material may be used with the mounting hub 102 to give the user more customization options. For instance, a different type of idler housing 104 may be used for different serpentine belts instead of changing the whole idler pulley. Consequently, the risk of damaging the bearings of the idler pulley may be minimized since the bearing would be inside the mounting hub 102 and the idler housing 104 of the multi-component idler 100 is only being changed.

As shown in FIG. 2, the threaded engagement between the idler housing 104 and the mounting hub 102 may be such that when the two components are fully rotated and screwed with each other, the threaded holes 118 of the mounting hub 102 align with the plurality of apertures 130 of the external idler housing 104. As a result of such alignment, a plurality of bolts 602 (see FIG. 6) may be used to fasten the idler housing 104 to the mounting 102 for the multi-component idler 100 to function properly under high-speed rotation during the operation of the belt and pulley system. The alignment of the threaded holes 118 with the apertures 130 is not limited to the fully screwed position of the idler housing 104 relative to the mounting hub 102. Such alignment may occur multiple times per one revolution of rotation of the idler housing 104 when adjusting its position, as explained elsewhere herein.

As seen in FIG. 2, the threaded holes 118 of the mounting hub 102 may extend through the full length, or the majority of the length, of the mounting hub 102. But there may be other examples where the threaded holes 118 extend through only a fraction of the length of the mounting hub 102, as describe elsewhere herein. The threaded holes 118 extending through the length of the mounting hub 102 may allow the usage of longer bolts for much more secure fastening.

As shown in FIG. 2, the internal surface of the idler housing 104 farthest from the front housing face 132 may have a tapering portion 204 that narrows the thickness of the rear end of idler housing 104. The tapering portion 204 may have a smooth surface and gradually narrow the thickness of the rear end portion of the idler housing 104. The tapering portion 204 may be implemented to reduce the total weight of the idler housing 104. Alternatively, the internal surface of the idler housing 104 may have an internal threaded section 128 extending through its full length to allow from more secured coupling and also more adjustability of the idler housing 104 relative to the mounting hub 102, as described elsewhere herein.

When assembling the bearing 608 (see FIG. 6) with the multi-component idler 100, the bearing 608 may be placed in the inner surface 112 of the mounting hub 102 between grooves 114. The grooves 114 may be used to lock the bearing 608 in place either by using sealing components 610 or merely by the usage of the spacing of the grooves 114 themselves. The grooves 114 may also create extra spacing between the bearing 608 and the mounting surface of the belt and pulley system on the automobile engine, either by a central bolt 604 (see FIG. 6) or a rotational shaft.

Referring now to FIG. 3, a perspective cross-sectional view of the multi-component idler 100 with the two main components coupled but separated from each other at a second position is shown. The position of the idler housing 104 may be adjusted relative to the mounting hub 102 along the idler axis 202. This may be done by utilizing the internal threaded section 128 of the idler housing 104 with the threaded portion 110 of the mounting hub 102 and screwing and unscrewing the idler housing 104 along the idler axis 202. The threaded portion 110 of the mounting hub 102 may be considered as the male thread, and the internal threaded section 128 of the idler housing 104 may be considered as the female thread. The thread pitch of the threaded portion 110 of the mounting hub 102, which may be the same as the internal threaded section 128 of the idler housing 104, may control how much the axial position of the idler housing 104 changes per revolution of rotation. By way of example and not limitation, the pitch of thread of the threaded portion 110 and the internal threaded section 128 may range between 0.030 inches to 0.090 inches per revolution. In a preferred example, the pitch of thread may be 0.060 inches per revolution.

As the idler housing 104 is rotated, the separation distance 302 between the inner front housing surface 304 of the idler housing 104 and the front face 116 of the mounting hub 102 widens or narrows depending on the direction of rotation. The axial position adjustment of the idler housing 104 may be broken down by how many times in one revolution the housing may be rotated such that the apertures 130 align with the threaded holes 118 of the mounting hub 102. By way of example and not limitation, the apertures 130 and the threaded holes 118 may be adjustably aligned with each other between two to 12 times per revolution, corresponding to how many apertures 130 and threaded holes 118 are implemented. By way of example and not limitation, the apertures 130 and the threaded holes 118 may be adjustably aligned with each other in six rotational positions per one revolution if there exist six apertures 130 and six corresponding threaded holes 118. In the same example, the threaded holes 118 and the apertures 130 may be adjustably aligned with each other per 60 degrees of rotation if such holes are symmetric and equidistant from each other. In the same example, if the pitch of thread of the threaded portion 110 of the mounting hub 102 and the internal threaded section 128 of the idler housing 104 is approximately 0.060 inches per revolution, then each incremental rotational adjustment done in one revolution to align an aperture 130 with the next threaded hole 118 would alter the separation distance 302 by 0.010 inch. Other exemplary combinations may be used with the described pitch of thread range and also the number of holes on the idler housing 104 and mounting hub 102. For example, if there are four apertures 130 equidistant from each other and four corresponding threaded holes 118, then each incremental rotation in one revolution to align an aperture 130 with the adjacent threaded hole 118 would alter the separation distance 302 by one-fourth of the pitch of thread measured in one revolution. The pitch of thread may have the value range as described elsewhere herein.

Figure 4:
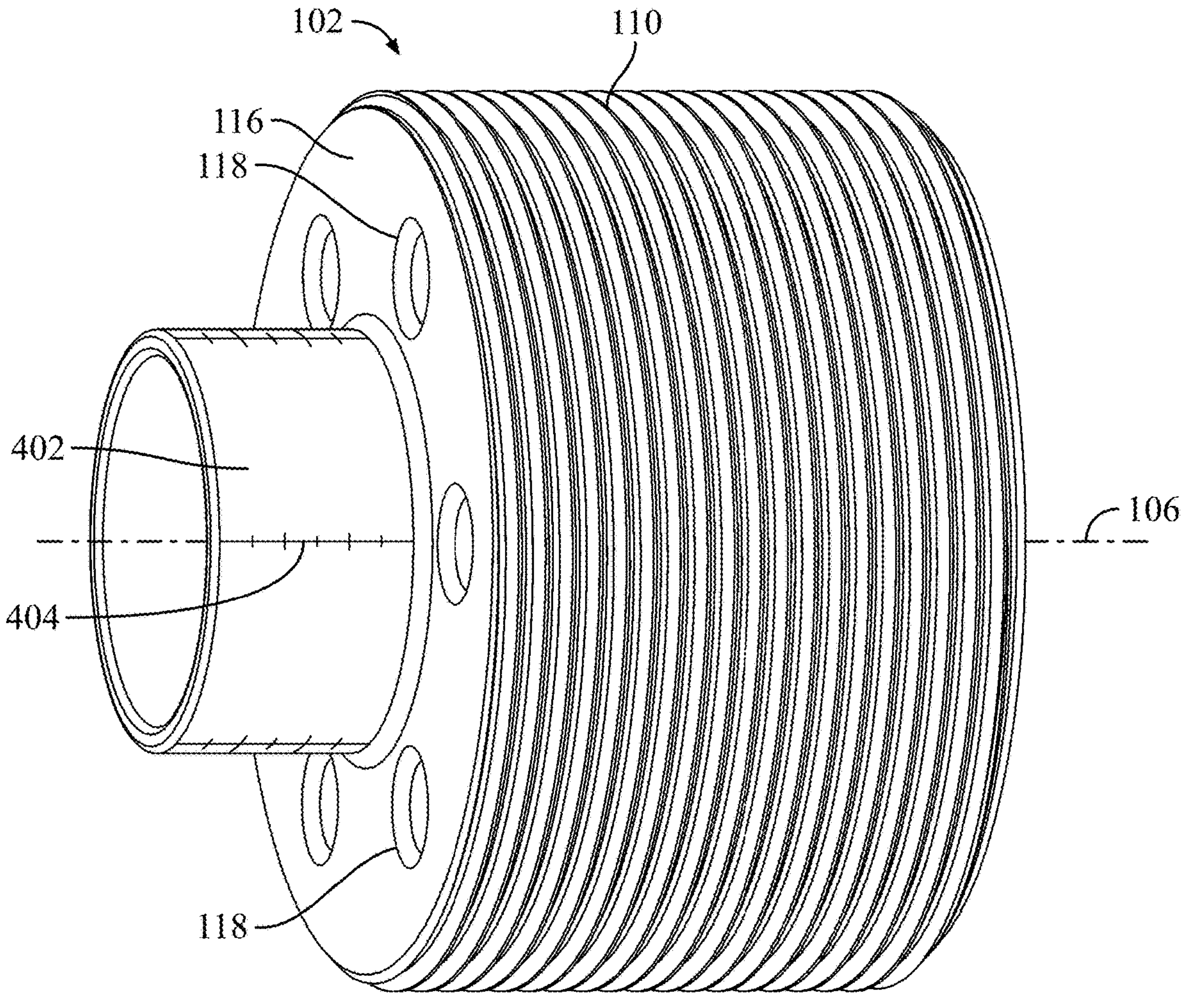
FIG. 4 shows a perspective view of one example of a mounting hub.
Figure 5A:
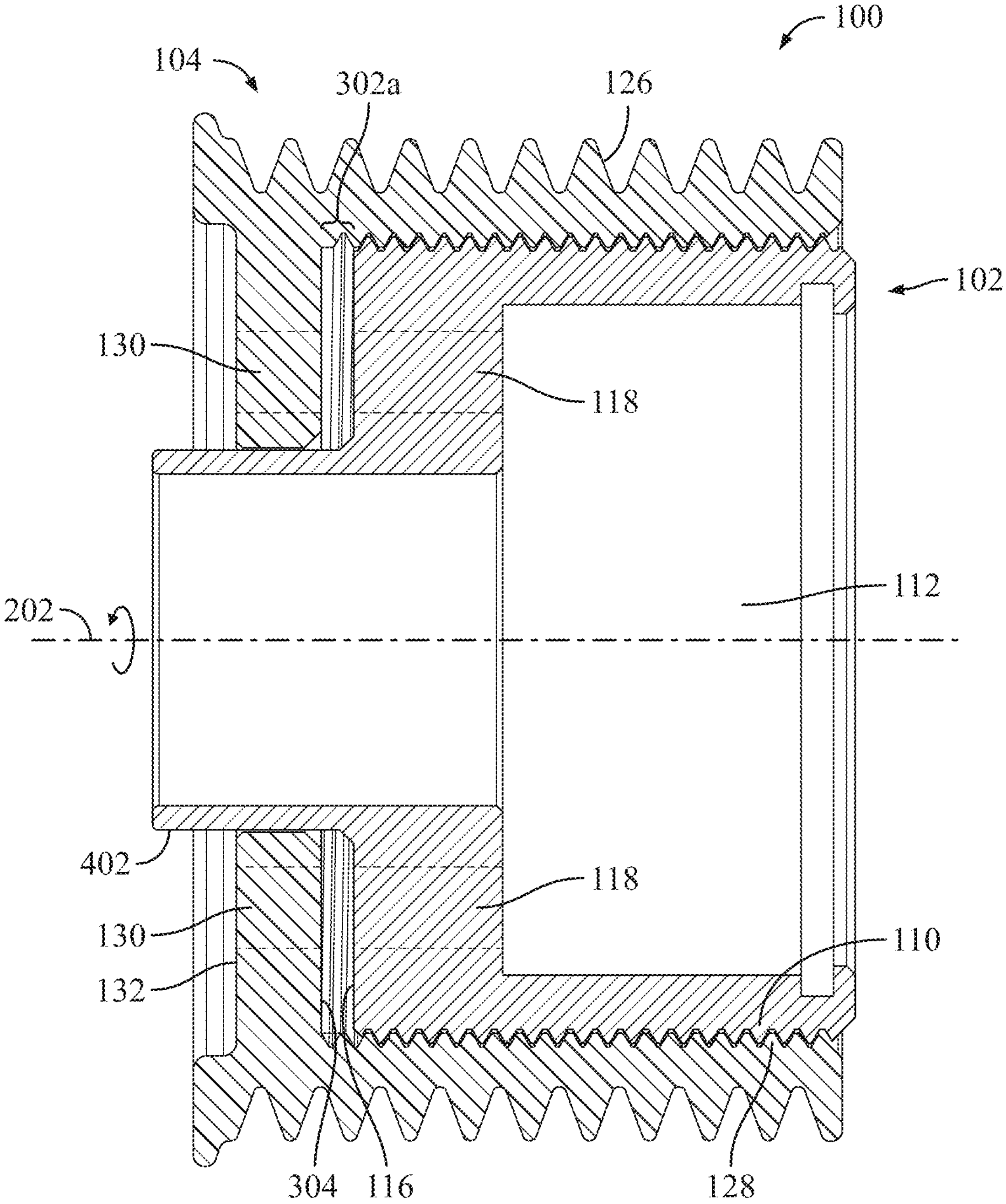
FIG. 5A shows a side cross-sectional view of the multi-component idler using the mounting hub shown in FIG. 4 with the two main components coupled to each other in a first position.
Figure 5B:
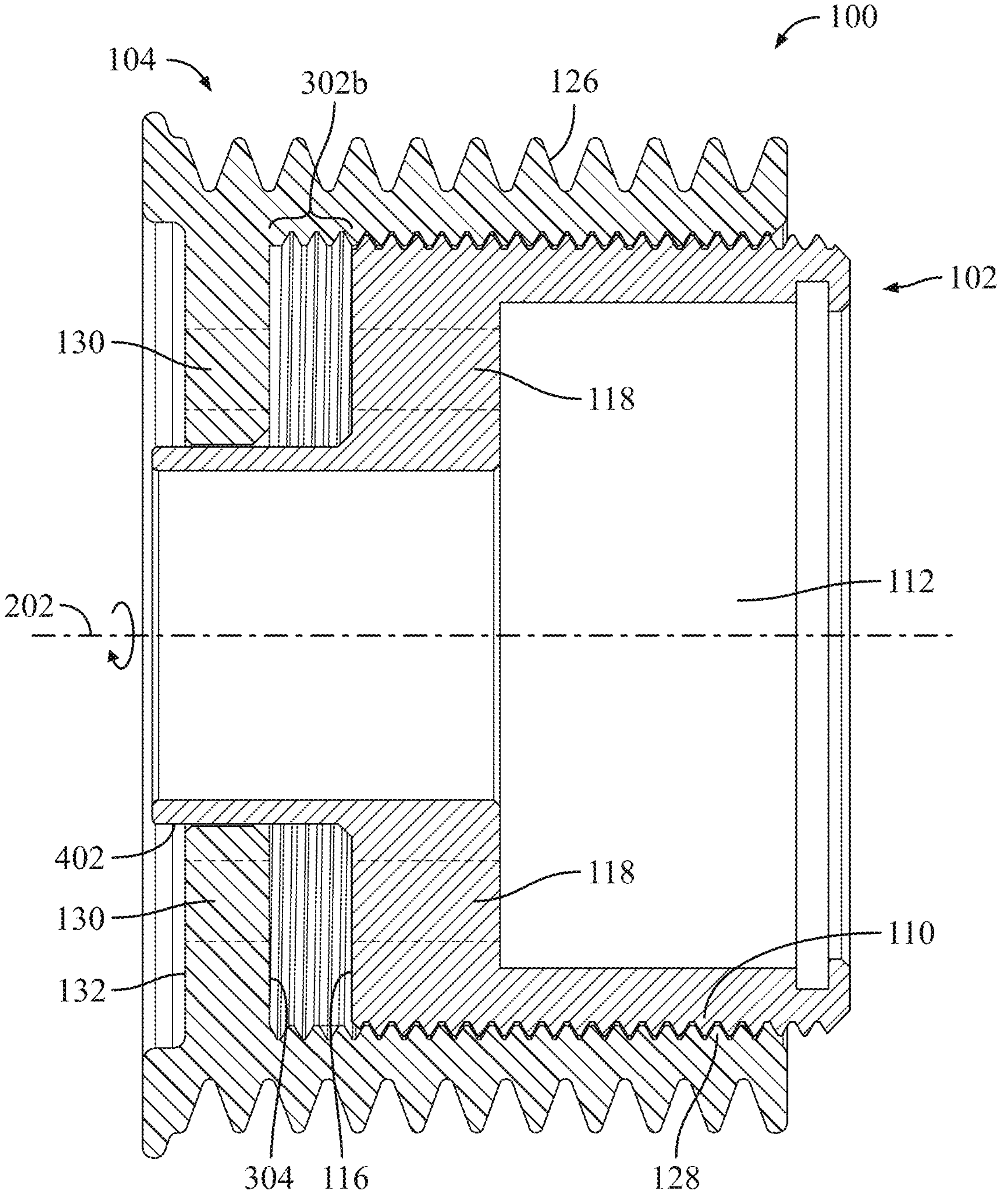
FIG. 5B shows a side cross-sectional view of the multi-component idler using the mounting hub shown in FIG. 4 with the two main components coupled to each other in a second position.

Referring now to FIG. 4, a perspective view of one example of a mounting hub 102 having a protruding boss 402 is shown. The protruding boss 402 may be a hollow cylinder extending outwards from the front face 116 of the mounting hub 102 along the central axis 106. The protruding boss 402 may be integrated with the front face 116 and be surrounded by the threaded holes 118. As shown in FIGS. 5A-B, the protruding boss 402 may be designed to extend out of the front housing face 132 of the external idler housing 104 when the idler housing 104 is mounted to the mounting hub 102. As such, the protruding boss 402 may be used as a measuring component for a user to observe and determine the separation distance 302*a* (see FIG. 5A) and how much the external idler housing 104 has been screwed or unscrewed from the mounting hub 102. Consequently, the user may precisely measure and adjust the distance of the idler housing 104 and where the serpentine belt would be mounted on the multi-component idler 100 and the belt and pulley system.

The protruding boss 402 may have gradation marks 404 running along its length to precisely indicate to the user the measurement of the axial position of the idler housing 104 (see FIG. 5A) when rotating the idler housing 104 inward or outward relative to the mounting hub 102. By way of example and not limitation, the gradation marks 404 may quantify the separation distance 302*a* (see FIG. 5A) between the front face 116 of the mounting hub 102 and the inner front housing surface 304 of the idler housing 104 with incrementation markings. The separation distance 302*a* may correspond to the position of the external surface 126 of the idler housing 104 and where the serpentine belt would be mounted relative to the automobile engine and the other components of the belt and pulley system. The gradation marks 404 may have incrementations and sub-incrementations defining the measurement of the axial position of the idler housing 104. By way of example and not limitation, the incrementation markings may be divided by equal measurements in a range of 0.005 to 0.020 inches, and the sub-incrementation markings may be divided by equal measurements in a range of 0.001 to 0.010 inches. The gradation marks 404 may have incrementation markings of negative and positive values, with a zero-value marking in the middle of the integer values, which the zero-value marking may be at the middle of the protruding boss 402. Alternatively, the gradation marks 404 may have positive value markings increasing in value along the length of the protruding boss 402 from a zero-value marking adjacent to the front face of the mounting hub 102.

The mounting hub 102 shown in FIG. 4 may also be considered as a compact size since the threaded holes 118 are in a radial array that is relatively close to the central axis 106. As a result, the threaded holes 118 of the mounting hub 102 in FIG. 4 may not penetrate through the whole length of the cylindrical body and may stop short of contacting the inner surface 112 portion (see FIG. 5A) of where the bearing would be placed. Additionally, the threaded portion 110 may cover the whole length of the outer surface of the mounting hub 102.

Referring to FIGS. 5A-B, side cross-sectional views of the multi-component idler 100 with the two main components coupled to each other at different positions are shown. The axial position of the idler housing 104 may change from the first separation distance 302*a* of FIG. 5A to the second separation distance 302*b* of FIG. 5B. This may be done by rotating and unscrewing the idler housing 104 from the mounting hub 102 using the threading engagement between the two components. The first and second separation distances 302*a-b* may correspond to the position of the external surface 126 of the idler housing 104 and where the serpentine belt would be mounted relative to the automobile engine and the other components of the belt and pulley system. When the idler housing 104 is positioned at the desired axial position, fastening bolts 602 (see FIG. 6) may be used to fasten and fix the position of the idler housing 104 relative to the mounting hub 102.

The adjustment of the external idler housing 104 from the first separation distance 302*a* to the second separation distance 302*b* of FIG. 5B may be done by rotating the idler housing 104 in a counterclockwise direction about the idler axis 202. As shown in FIG. 5B, this consequently adjusts the axial position of the idler housing 104 away from the mounting hub 102. Alternatively, the multi-component idler 100 may be designed to be rotated clockwise to widen the separation distance between the idler housing 104 and the mounting hub 102. Additionally, the separation distance between the idler housing 104 and the mounting hub 102 may be narrowed by rotating the idler housing 104 clockwise. Alternatively, the separation distance between the idler housing 104 and the mounting hub 102 may be narrowed by a counterclockwise rotation.

As shown in FIGS. 5A-B, the internal threaded section 128 may span the whole length of the internal surface of the idler housing 104. Similarly, the threaded portion 110 may span the whole length of the outer surface of the mounting hub 102. Consequently, the idler housing 104 may be adjusted axially in more positions relative to the mounting hub 102. The amount of axial adjustment per revolution of rotation may depend on the thread pitch of the internal threaded section 128 and the threaded portion 110. The farther the distance between adjacent threads, the greater the change in axial position of the idler housing 104 per revolution of rotation.

As shown in FIGS. 5A-B, the idler housing 104 may be rotated and adjusted such that the apertures 130 align with the threaded holes 118 at the desired axial position, which may be the first or second separation distances 302*a-b*.

Furthermore, the threaded holes 118 of the mounting hub 102 may penetrate through the cylindrical body, but short of contacting the inner surface 112 of where the bearing 608 would be located. Such multi-component idler pulley 100 shown in FIGS. 5A-B may be seen as compact or medium sized since the threaded holes 118 are relatively closer to the idler axis 202 and overlap radially with where the bearing of the device would be placed.

The protruding boss 402 and its gradation marks 404 (see FIG. 4) may also help in positioning the idler housing 104 in a desired axial position relative to the mounting hub 102. The protruding boss 402 may stick out of the center cavity of the front housing face 132 for a user to observer and measure the gradation marks 404 as the external idler housing 104 is adjusted relative to the mounting hub 102. As shown in FIG. 5B, the protruding boss 402 may be retracted inside when the separation distance 302*b* is widened, and the user may observe and measure the gradation marks relative to the first separation distance 302*a* of the idler housing 104 in FIG. 5A. As such, the user may decide whether the parts are in desired positions and fasten the idler housing 104 with the mounting hub 102 using bolts.

Referring now to FIG. 6, a perspective cross-sectional view of the multi-component idler 100 with bolts and a bearing implemented is shown. As assembled, the multi-component idler 100 may be part of the belt and pulley system of an automobile engine and have a serpentine belt (not shown) coupled to the external surface 126 of the idler housing 104. The external idler housing 104 may be adjustably coupled with the mounting hub 102 via the threading engagement between the two components, as describe elsewhere herein. Although the mounting hub 102 may have a threaded portion 110 along the length of its outer surface, as shown in FIG. 6, the idler housing 104 may have an internal threaded section 128 adjacent to the front housing face 132 and a tapering portion 204 near the rear end of the idler housing 104 with a narrower overall thickness. The mounting hub 102 may also have a rear section that is tapered to reduce the overall weight of the multi-component idler 100. Alternatively, the mounting hub 102 may have a thicker and smooth rear end, relative to its front end, to be close-fitted in the tapering portion 204 of the idler housing 104.

When the idler housing 104 is adjusted at a desired axial position relative to the mounting hub 102, such that the apertures 130 also align with the threaded holes 118, the two bodies may be fastened to each other using a plurality of bolts 602. The plurality of bolts 602 may penetrate through the apertures 130 and the threaded holes 118 to fasten the idler housing 104 with the mounting hub 102. By way of example and not limitation, the threaded holes 118 may be threaded but the apertures 130 may not be threaded. Alternatively, both the apertures 130 and the threaded holes 118 may all be threaded. By way of example and not limitation, the number of bolts used may equal to the number of threaded holes 118 and apertures 130, which may range from 2-12 bolts. Alternatively, less bolts 602 may be used than there are corresponding threaded holes 118 and apertures 130. Similar to the threaded holes 118 and the apertures 130, the orientation of the bolts 602 may be equidistant and symmetric from each other to maintain equal balance and fastening force during the operation of the idler pulley. Similar to the threaded holes 118 and the apertures 130, the radial positioning of the bolts 602 relative to the idler axis 202 may vary depending on the type and size of the multi-component idler 100 in general. For the compact and medium sized multi-component idler 100 (idler-housing outer-diameter of 1.51-2.5 inches and 2.51-3.5 inches, respectively), the bolts may be radially closer to the idler axis 202 such that they would radially overlap with the inner surface 112 of the mounting hub 102 and where the bearing 608 would be located. Consequently, the bolts may be short so that the bolt heads contact the front housing face 132 of the idler housing 104 but the bolt tips do not contact the bearing 608. Alternatively, for the large sized multi-component idler 100 (idler-housing outer-diameter of 3.51-6.0 inches), the bolts 602 may be radially farther from the idler axis 202 such that they occupy the radial space outside the inner surface 112 of the mounting hub 102. Consequently, the bolts 602 may then be longer to penetrate farther in the length of the mounting hub 102 and also be parallel to the length of the inner surface 112.

The bearing 608 may be installed in the inner surface 112 of the mounting hub 102 between one or more grooves 114, where one of the grooves 114 may be located near the rear-end of the mounting hub 102. The one or more grooves 114 may span around the circumference of the inner surface 112 and may be used to secure the bearing 608 in place. By way of example and not limitation, sealing components 610 may be placed within the grooves 114 after the bearing 608 has been placed within the inner surface 112 to prevent the bearing 608 from moving axially along the idler axis 202. The sealing component 610 may be a flexible or rigid ring that may be designed to fit inside the groove 114 and prevent the bearing 608 from slipping out of place. Alternatively, the grooves 114 themselves may act as a barrier in preventing the bearing 608 from slipping out of place. The rear groove 114 may also act as a separation portion of the mounting hub 102 that distances the bearing 608 from the structure that the mounting hub 102 and the multi-component idler pulley 100 are supposed to be fastened on. By way of example and not limitation, the bearing 608 may be a ball or a roller bearing.

The multi-component idler pulley 100 may be installed to the belt and pulley system of the automobile engine by a central bolt 604 and bushing 606 or be mounted on a rotatable shaft of the belt and pulley system. A central bolt 604 may be inserted through the hollow center of the mounting hub 102 along the idler axis 202 to fasten the mounting hub 102, having the external idler housing 104, to the mounting surface. The mounting surface may be located on the automobile engine. The central bolt 604 may penetrate through a bushing 606 so that the bushing 606 may be placed in between the central bolt 604 and the mounting surface to provide a more secure fastening. By way of example and not limitation, the bushing 606 may rest proximate to the inner surface 112 of the mounting hub 102 and where the bearing 608 is located. The bushing 606 may be rigid or flexible. Alternatively, a washer may be used instead of a bushing 606. The washer may be a shoulder or flat washer. With the multi-component idler pulley 100 fastened to the mounting surface, the idler pulley may rotate around the idler axis 202 because of the bearing 608 allowing rotational motion to occur at a fixed translational position. Alternatively, the multi-component idler pulley 100 may be mounted to a rotatable shaft via the hollow center of the mounting hub 102, instead of using a bearing 608 and a central bolt 604.

The serpentine belt (not shown) may be installed on the external surface 126 of the idler housing 104. The external surface 126 may be ribbed and have one or more fences 124*a*-*b*. By way of example and not limitations, the external surface 126 may have between 4-16 ribs. The one or more fences 124*a*-*b*, particularly the rear fence 124*b*, may be omitted if there exists limited space where the multi-component idler pulley 100 is being installed. The number of ribs and the length of the idler housing 104 may also be reduced if where the multi-component idler pulley 100 is being installed may have limited spacing.

Figure 7:
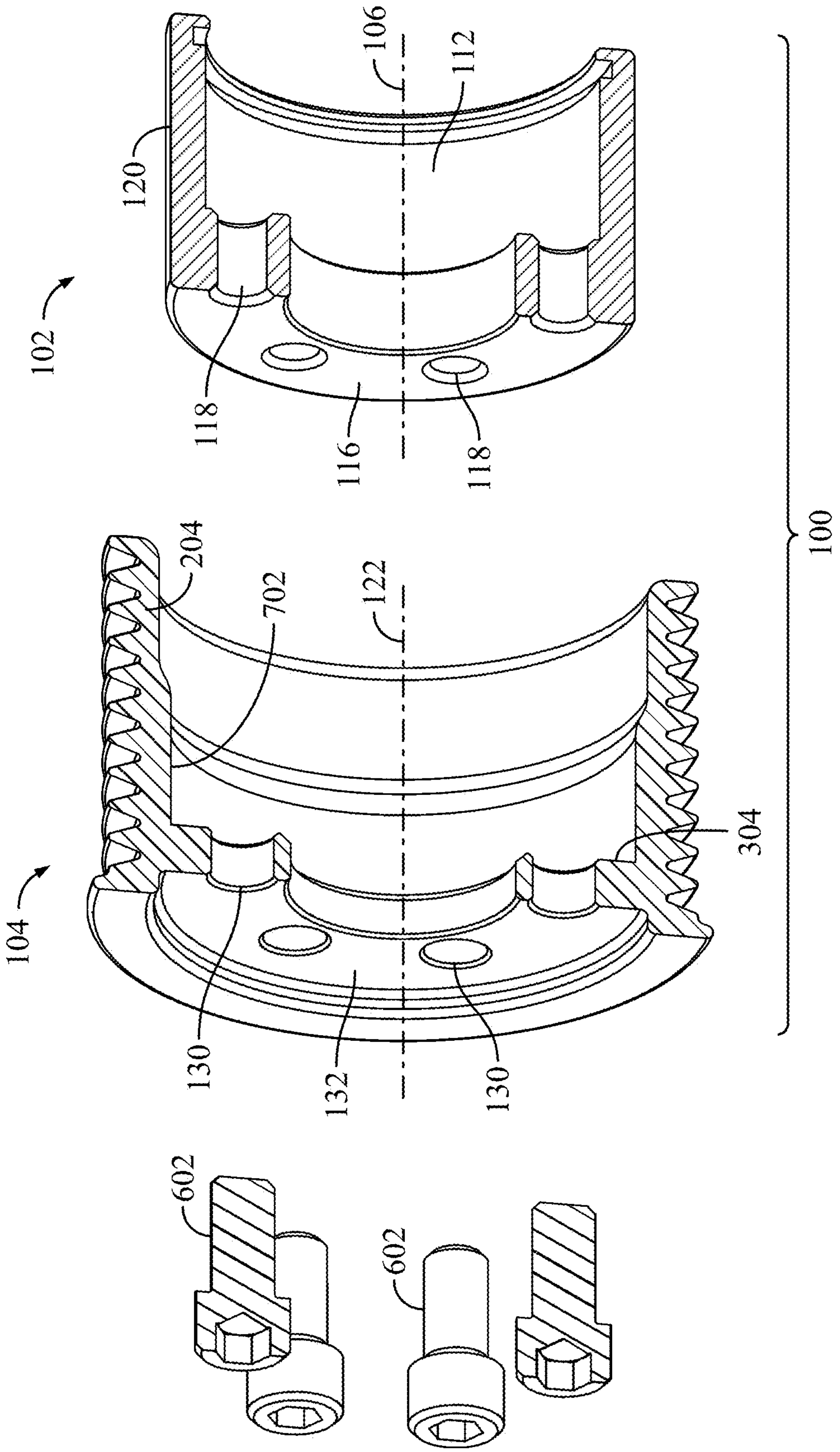
FIG. 7 shows an exploded cross-sectional perspective view of a second embodiment of the multi-component idler having smooth engagement between the two main components.

Referring now to FIG. 7, an exploded cross-sectional perspective view of the multi-component idler 100 having smooth engagement between the two main components is shown. The smooth engagement between the mounting hub 102 and the external idler housing 104 may be seen as a second embodiment, where one or more shims 1002*a-c* (see FIG. 10) may be used to adjust the axial position of the idler housing 104 relative to the mounting hub. The main difference of this example and the others described elsewhere herein is that a threaded engagement is not used in coupling the external idler housing 104 to the mounting hub 102. The internal threaded section of the idler housing 104 may be replaced by an internal smooth section 702 that is adjacent to the inner front housing surface 304. Additionally, the mounting hub 102 may not have a threaded portion 110, and the smooth portion 120 may extend along the whole outer surface of the mounting hub 102. Consequently, a smooth engagement exists between the two components when the idler housing 104 is mounted to the mounting hub 102. As shown in FIG. 7, the internal surface for the external idler housing 104 may have a tapering portion 204 from approximately the mid-portion towards the rear end of the external idler housing 104. The tapering portion 204 may gradually narrow the cylindrical body thickness of the idler housing 104 to reduce weight. The mounting hub 102 may also have tapering on its body, particularly towards the rear end portion, to further reduce the weight of the multi-component idler pulley 100. Alternatively, the rear end portion of the outer surface of the mounting hub 102 may protrude outwards and be thicker to fit snug and contact the tapering portion 204 of the idler housing 104 when the two components are coupled together.

Figure 8:
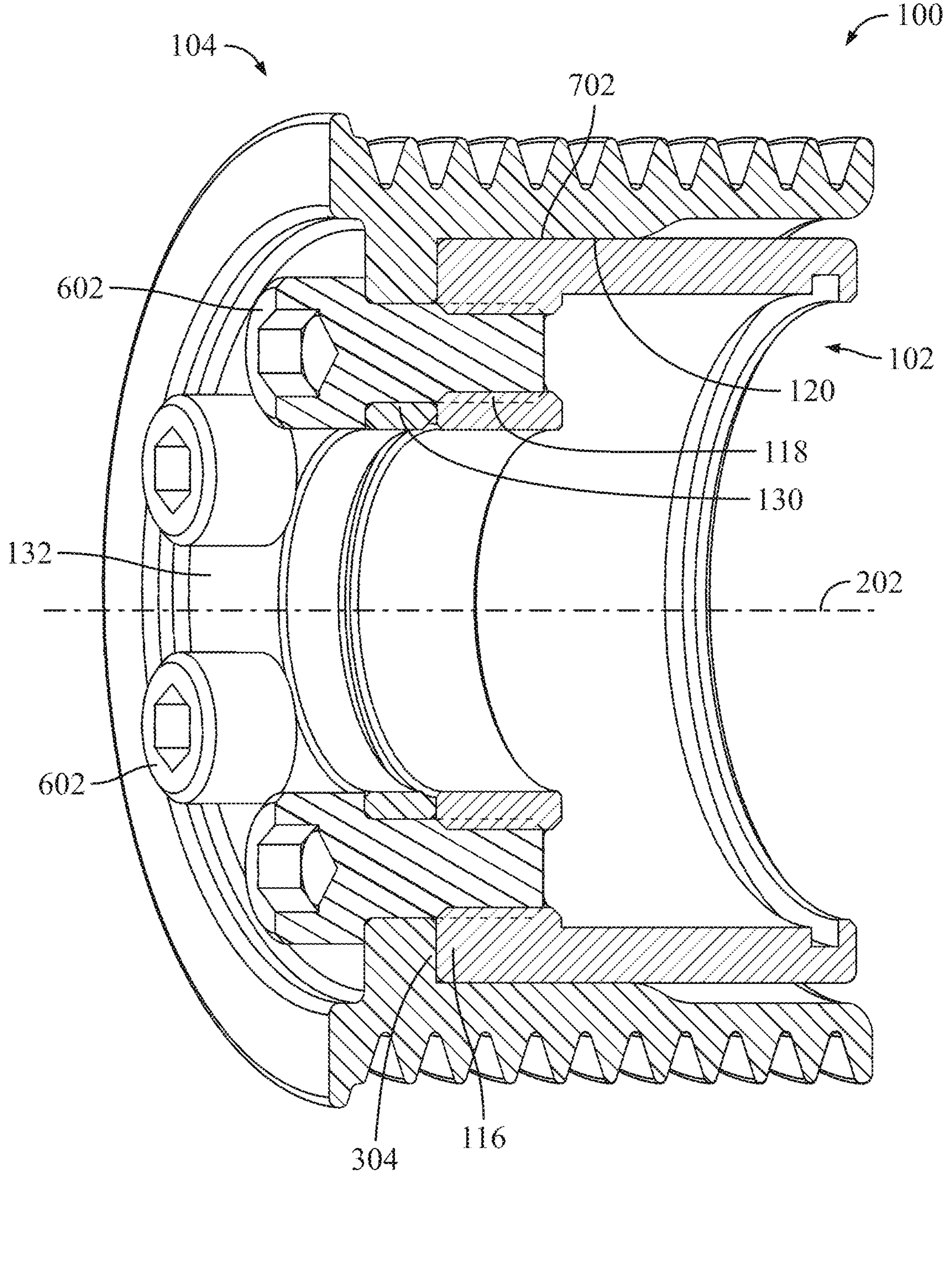
FIG. 8 shows a perspective cross-sectional view of the multi-component idler shown in FIG. 7 with the two main components coupled to each other at a first position and having smooth engagement between them.

Referring now to FIG. 8, a perspective cross-sectional view of the multi-component idler 100 having smooth engagements between the two main components and coupled to each other at a first position is shown. The internal smooth section 702 of the idler housing 104 may contact the smooth portion 113 of the mounting hub 102 when the idler housing 104 is mounted on the mounting hub 102. When mounted, the front face 116 of the mounting hub 102 may contact the inner front housing surface 304 of the idler housing 104. The external idler housing 104 may be fastened to the mounting hub 102 using fastening elements, for example bolts 602, using the apertures 134 and threaded holes 118. If spacing is required between the inner front housing surface 304 of the idler housing 104 and the front face 116 of the mounting hub 102, then one or more circular shims 1002*a-c* (see FIG. 10) may be placed in between such surfaces, as explained elsewhere herein.

Figure 9:
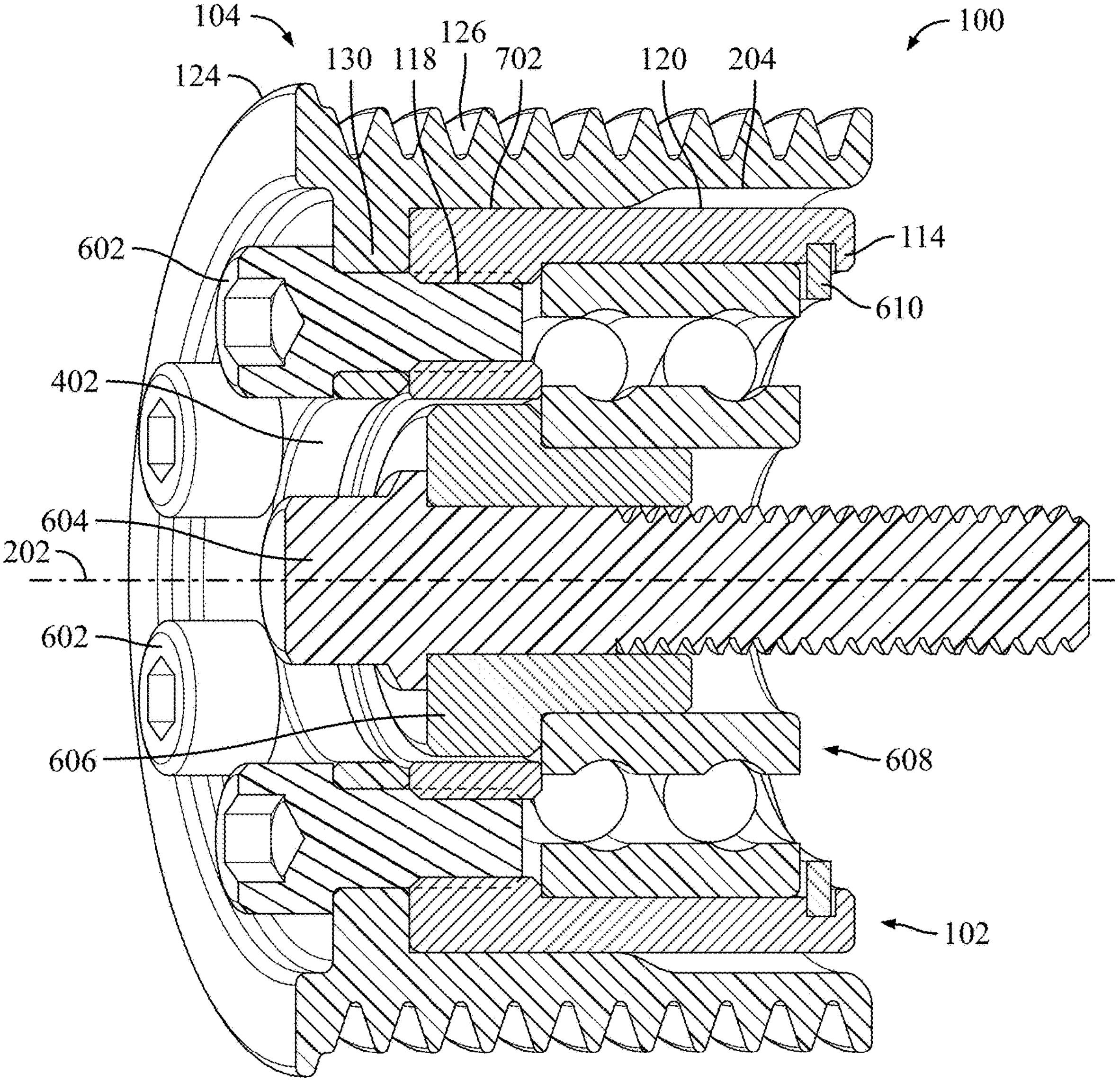
FIG. 9 shows a perspective cross-sectional view of the multi-component idler shown in FIG. 7 in the first position and having smooth engagement between the two main components with bolts and a bearing implemented.

Referring now to FIG. 9, a perspective cross-sectional view of the multi-component idler 100 with smooth engagement and having bolts 602 and a bearing 608 implemented is shown. The example shown in FIG. 9 may have similar features as described with respect to FIG. 6. The main difference between the two examples would be the smooth engagement between the internal smooth section 702 of the idler housing 104 and the smooth portion 113 of the mounting hub 102. Compared to FIG. 6, the multi-component idler 100 may not have a rear fence 124*b* and the bolts 602 may penetrate through the whole length of the bolt holes 118.

Figure 10:
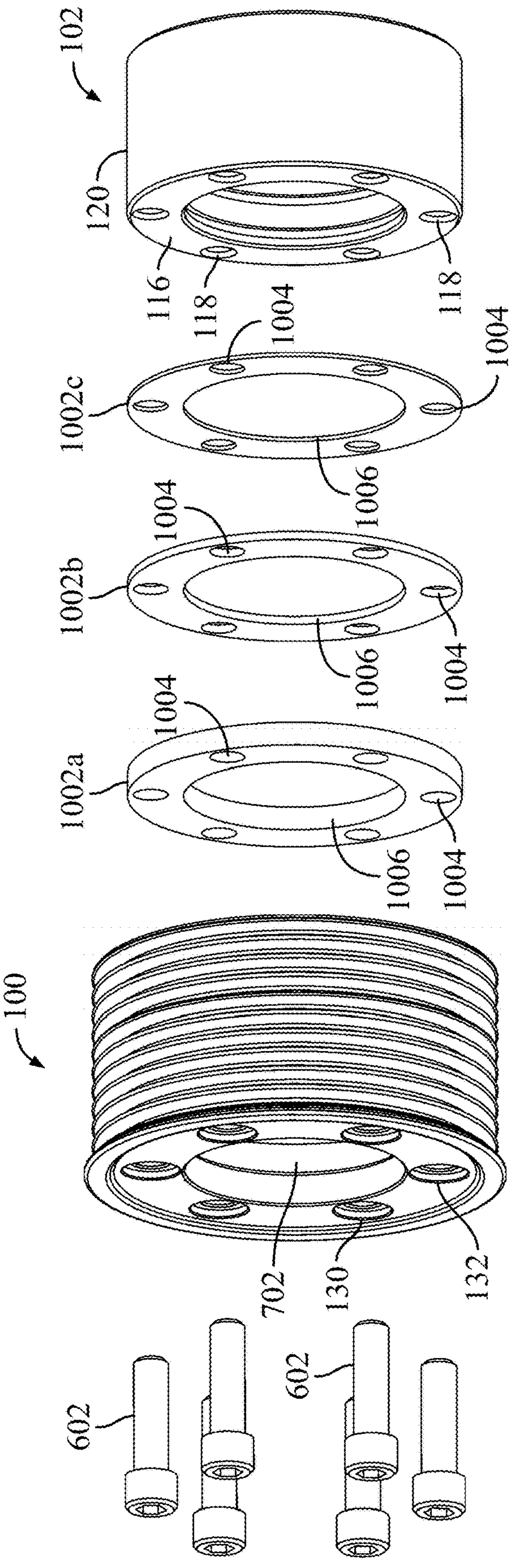
FIG. 10 shows an exploded perspective view of the multi-component idler shown in FIG. 7 having a plurality of shims between the two main components.
Figure 11:
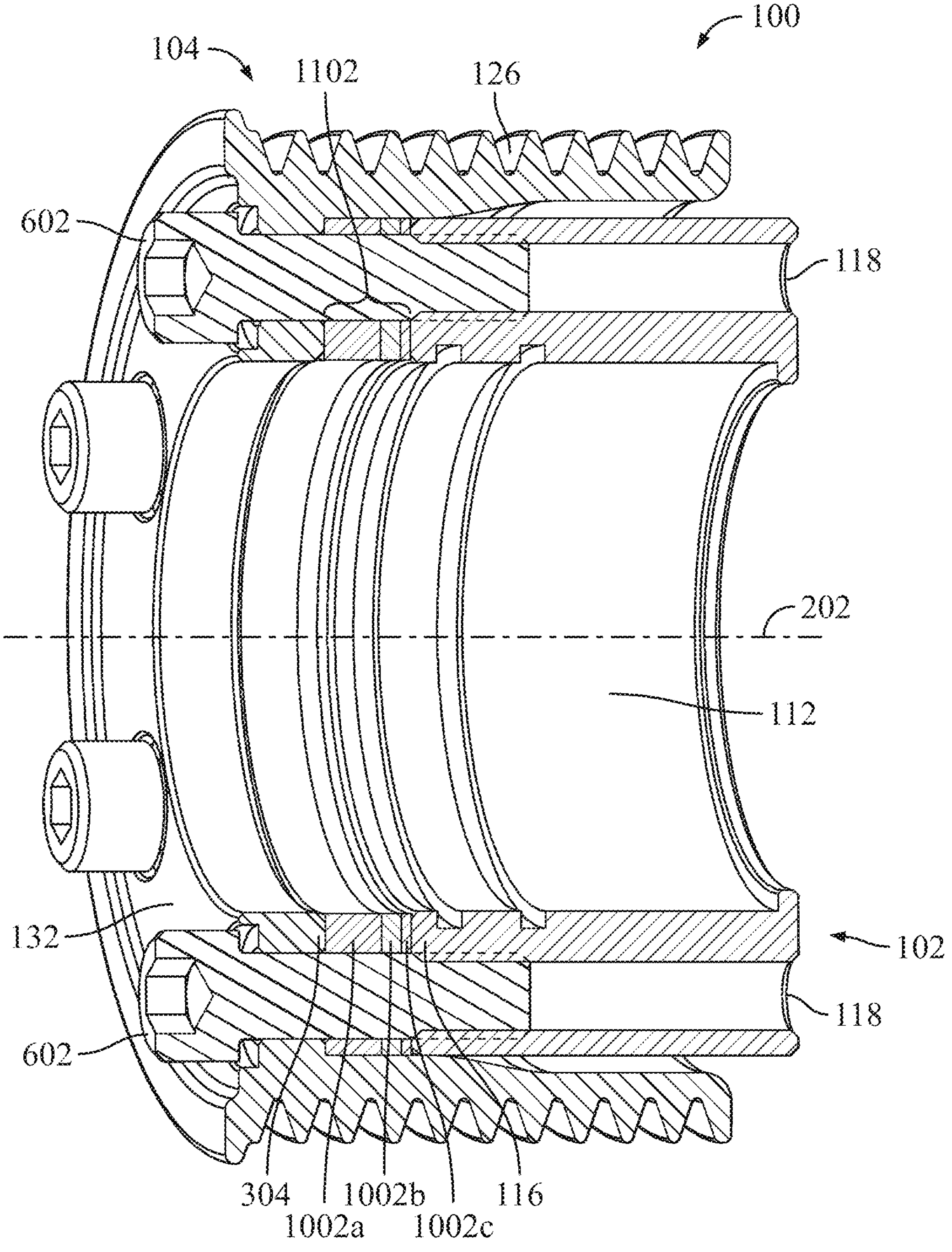
FIG. 11 shows a perspective cross-sectional view of the multi-component idler shown in FIG. 10 with the two main components fastened to each other in a second position and having a plurality of shims between each other.

Referring now to FIG. 10, an exploded perspective view of the multi-component idler 100 having a plurality of circular shims 1002*a-c* between the two main components is shown. The one or more shims 1002*a-c* may be used to adjust the axial position of the external idler housing 104 along the idler axis 202 (see FIG. 11) and relative to the mounting hub 102. The shims 1002*a-c* may be used as an alternative method of adjusting the axial position of the components instead of using threaded engagement between the mounting hub 102 and the idler housing 104. Particularly, the shims 1002*a-c* may be used when there exists a smooth engagement between the internal smooth section 702 of the idler housing 104 (see FIG. 7) and the smooth portion 120 of the mounting hub 102 when the idler housing 104 is mounted on the mounting hub 102. However, the shims may also be used in conjunction with a threaded engagement between the mounting hub 102 and the idler housing 104.

The shims 1002*a-c* may be circular disks with central holes 1006 and be dimensioned to align with the front face 116 of the mounting hub 102 and the inner front housing surface 304 of the idler housing 104 (see FIG. 11). The central bolt 604 (see FIG. 9) used for fastening the multi-component idler 100 to the mounting surface on the automobile engine may traverse through the central holes 1006 of the shims 1002*a-c*. The one or more shims 1002*a-c* may have bolt hole patterns 1004 similar to the threaded holes 118 of the mounting hub 102, and also similar to the patterns to the apertures 130 of the idler housing 104. As such, bolts 602 (see FIG. 6) may fasten the idler housing 104 to the mounting hub 102 with the one or more shims 1002*a-c* in between the two components. The one or more shims 1002*a-c* may come in different thicknesses, such as wide, medium, and narrow thicknesses. Different number of shims 1002*a-c*, which may have the same or different thicknesses, may be used depending on how much spacing is required between the two mounting hub 102 and the idler housing 104.

Figure 12:
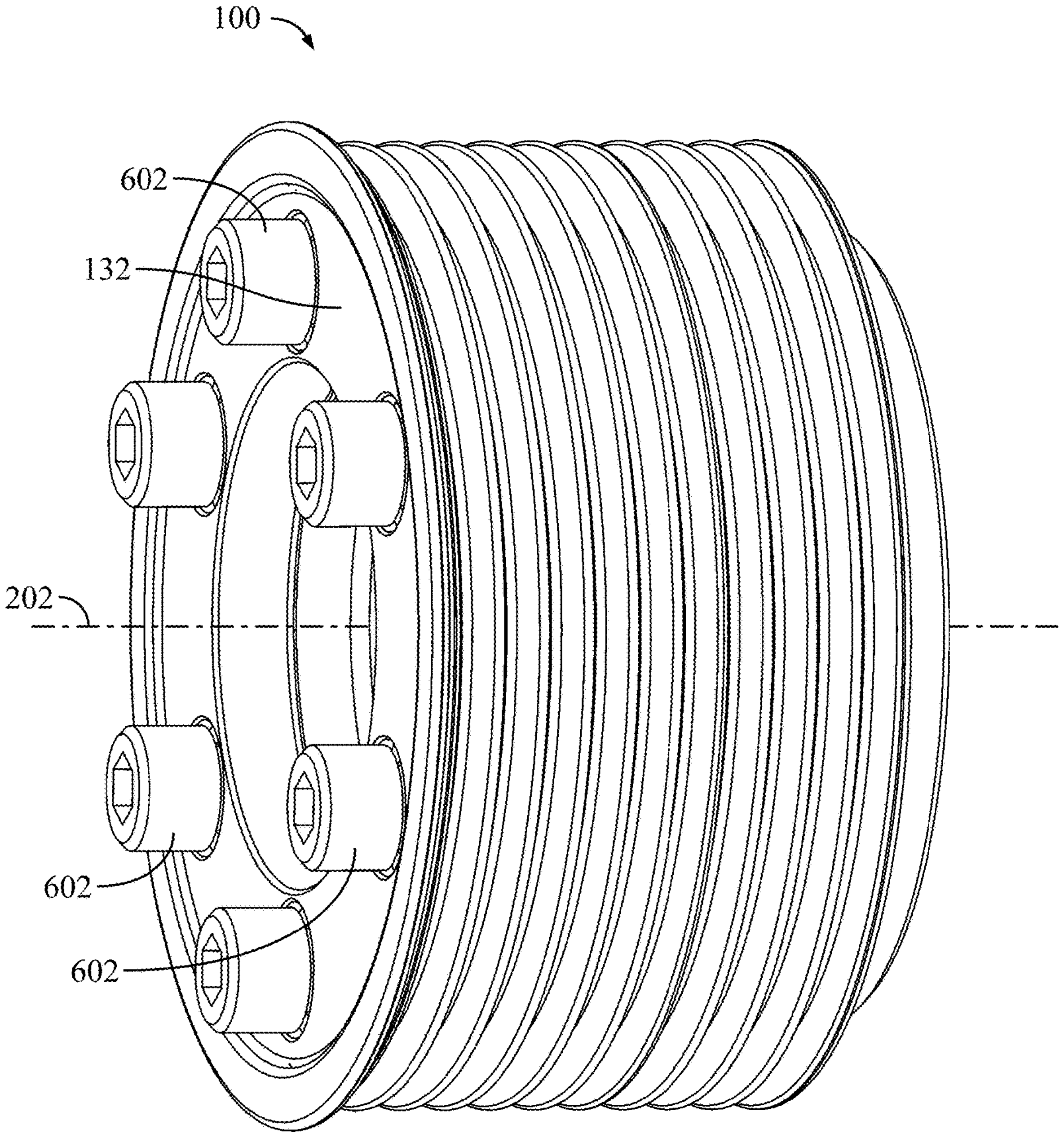
FIG. 12 shows a perspective view of the multi-component idler shown in FIG. 10 with the two main components fastened to each other.

Referring now to FIG. 11, a perspective cross-sectional view of the multi-component idler 100 with the two main components fastened and having a plurality of shims 1002*a-c* between each other is shown. The idler housing 104 may be mounted and fastened to the mounting hub 102 with one or more shims 1002*a-c* placed in between the components to create an axial separation distance 1102 between the idler housing 104 and the mounting hub 102 along the idler axis 202. In this way, the position of the serpentine belt mounted on the external surface 126 of the idler housing 104 may be adjusted to be farther or closer to the mounting surface of the belt and pulley system of the automobile. The multi-component idler 100 show in FIG. 11 may be a non-compact version since the threaded holes 118 of the mounting hub 102 do not overlap with the inner surface 112 and where the bearing would be placed. This is because the threaded holes 118 may be orientated radially farther outwards than the outer limits of the inner surface 112 of the mounting hub 102. FIG. 12 shows the perspective outside view of the multi-component idler 100 shown in FIG. 11.

Figure 13:
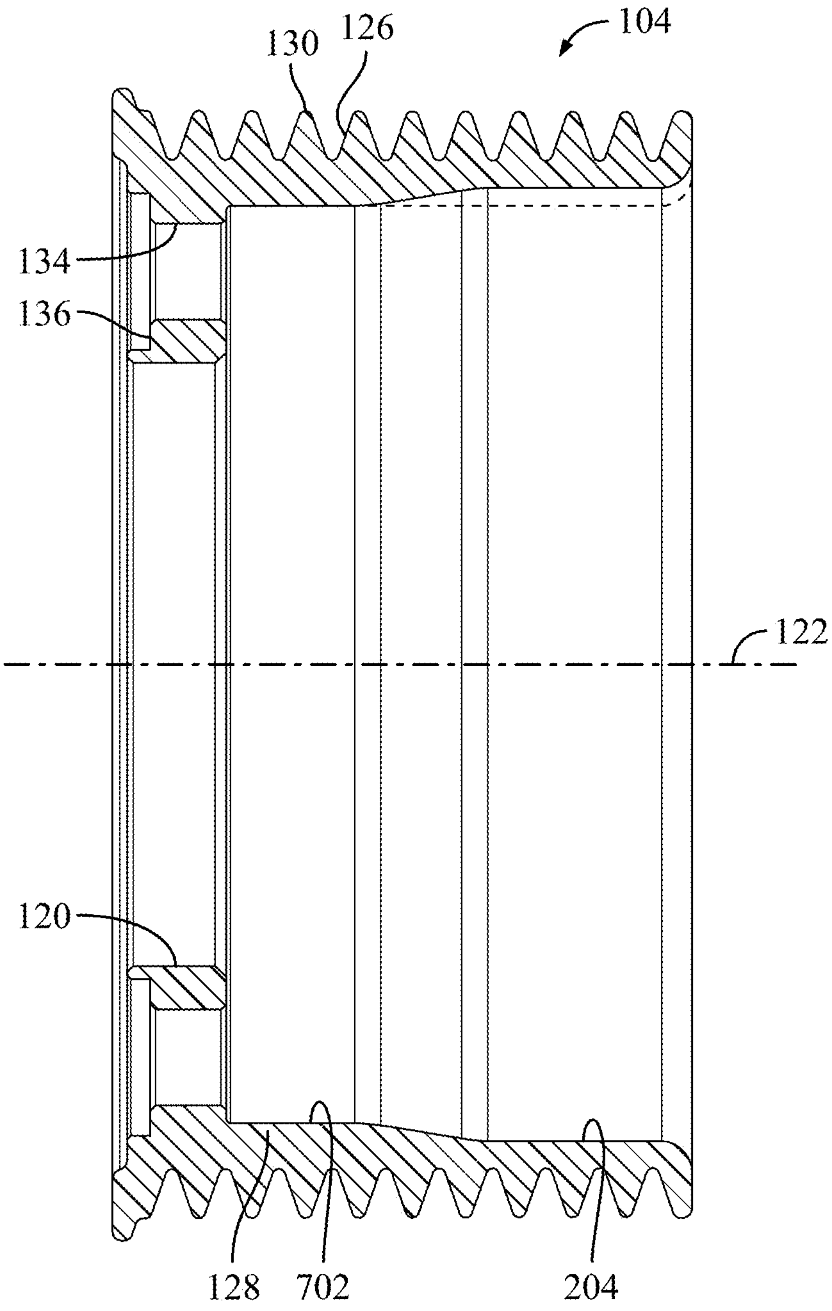
FIG. 13 shows a cross-sectional view of one example of the external idler housing.

Referring now to FIG. 13, a cross-sectional view of one example of the external idler housing 104 is shown. The external idler housing 104 may have similar features as describe elsewhere herein. Additionally, the external idler housing may have the internal smooth section 702 running through the length of the internal surface and have the tapering portion 204 omitted.

Figure 14:
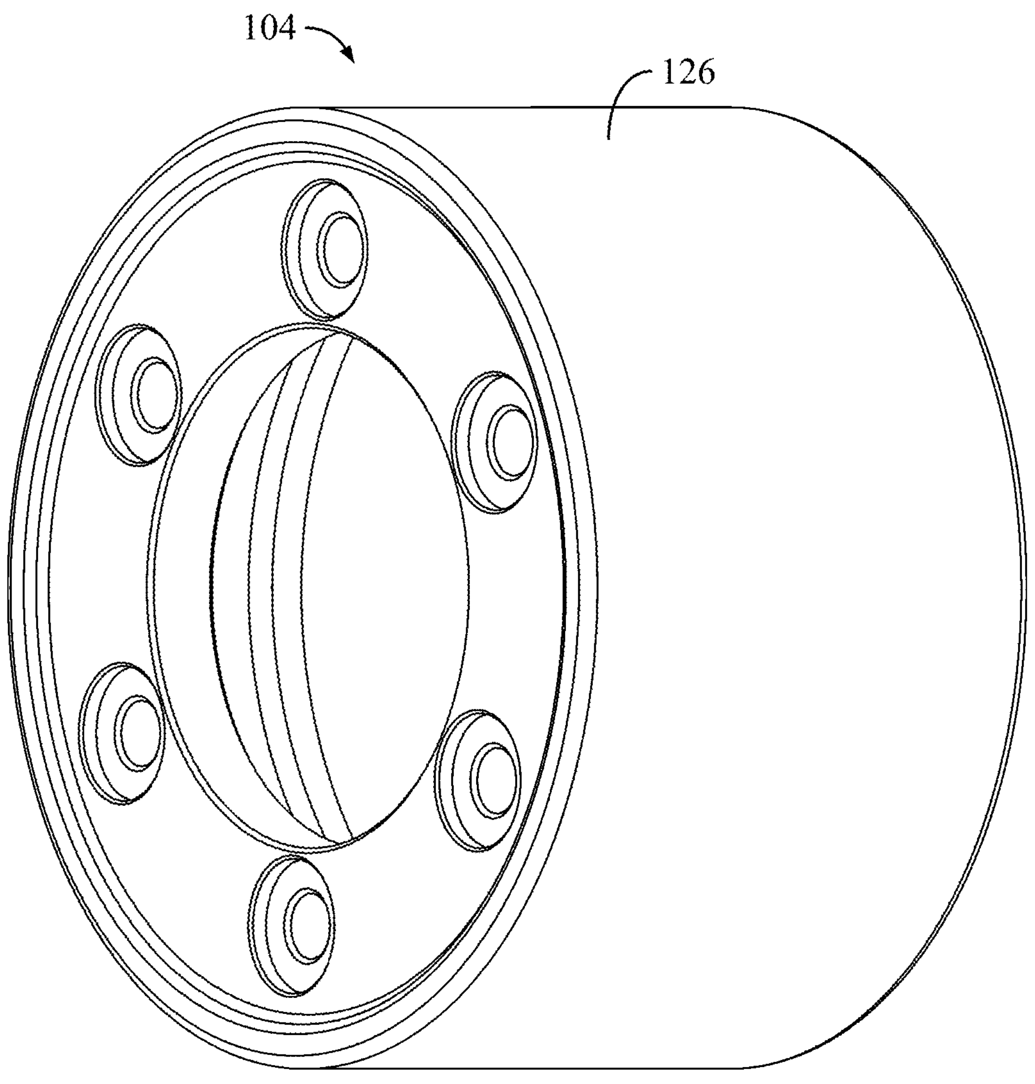
FIG. 14 shows a perspective view of one example of the external idler housing having a smooth external surface.
Figure 15:
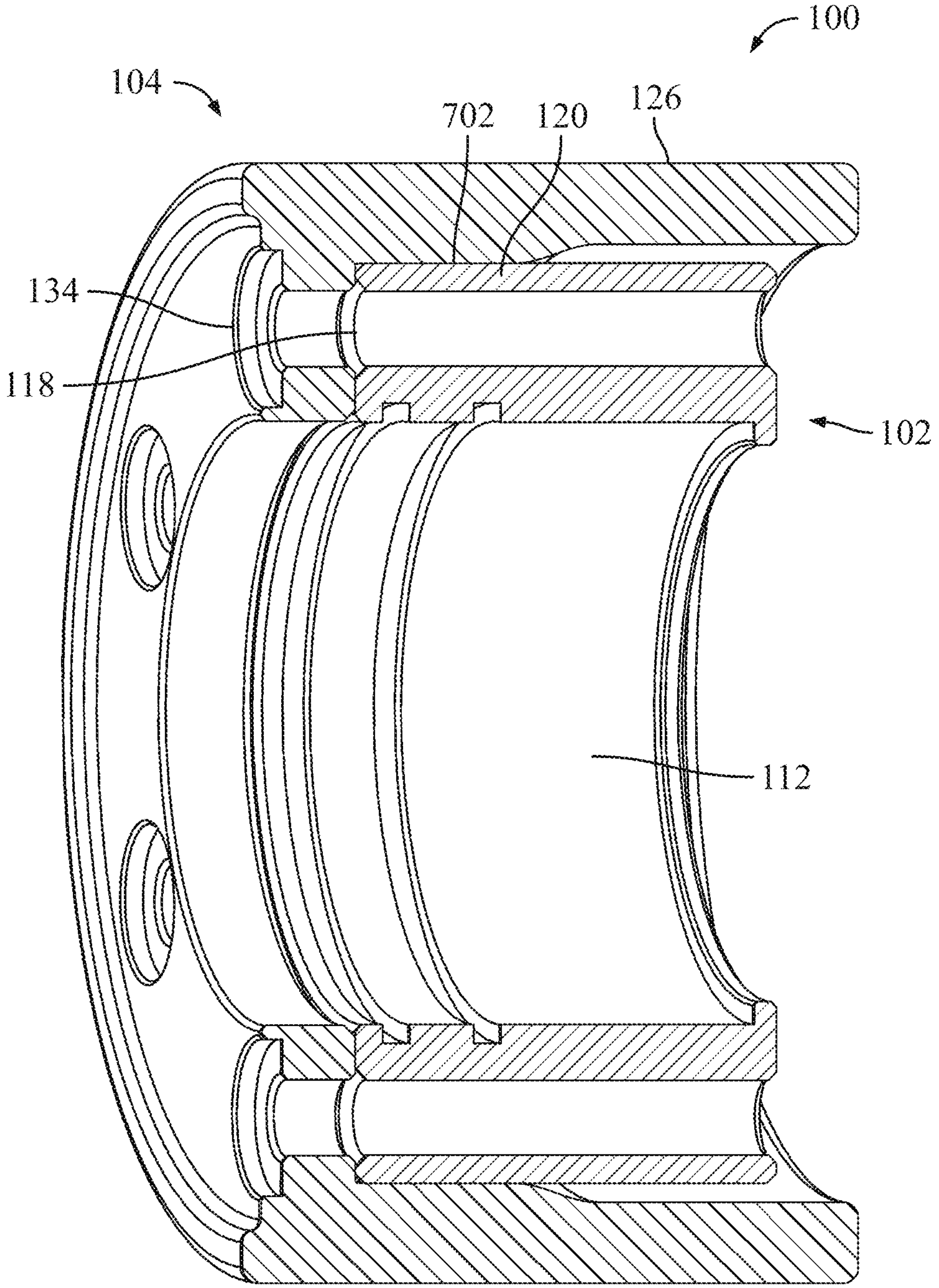
FIG. 15 shows a perspective cross-sectional view of the multi-component idler with an external idler housing having a smooth external surface.

Referring now to FIG. 14, a perspective view of another example of the external idler housing 104 is shown. In this example, the external surface 126 of the idler housing 104 has a smooth idler surface and the ribs are eliminated. The smooth idler surface may be necessary for mounting a different type of serpentine belt onto the multi-component idler 100. FIG. 15 shows a perspective cross-sectional of the multi-component idler 100 having the smooth idler surface and with the two main components joined with each other without the use of threading. In this example, the multi-component idler 100 may be seen as a non-compact version since the threaded holes 118 extend radially farther outwards than the inner surface 112 of the mounting hub 102.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An adjustable idler for a belt system of an automobile, the adjustable idler comprising:

a mounting hub attachable to a shaft of the belt system, the mounting hub having a plurality of holes radially about a central axis of the mounting hub;

an external idler housing adjustably fixable to the mounting hub, the external idler housing having a plurality of apertures that are alignable to the plurality of holes of the mounting hub;

a plurality of fasteners that are insertable through the plurality of apertures of the idler housing and engagable to the plurality of holes of the mounting hub to fix the idler housing to the mounting hub;

wherein the external idler housing is settable at two or more fixed axial positions of the mounting hub so that the external idler housing remains at the fixed axial position during rotation of the adjustable idler;

wherein an external cylindrical surface of the mounting hub has a thread and an internal cylindrical surface of the external idler housing has a thread for threadable engagement with the thread of the mounting hub so that rotation of the external idler housing changes the axial position of the external idler housing on the mounting hub at a rate equal to a pitch of the threads of the mounting hub and the external idler housing, and the axial position of the external idler can be set by inserting the plurality of fasteners through the plurality of apertures of the external idler and engaging the plurality of holes.

2. The adjustable idler of claim 1 wherein each of the plurality of fasteners are equidistantly spread apart from each other.

3. The adjustable idler of claim 1 wherein the plurality of fasteners is balanced about a rotational axis of the idler housing.

4. The adjustable idler of claim 1 wherein the plurality of apertures of the idler housing is aligned to plurality of holes of the mounting hub in two rotational positions less than 360 degrees.

5. The adjustable idler of claim 1 wherein the mounting hub is housed within an internal surface cavity of the external idler housing.

6. The adjustable idler of claim 1 further comprising a plurality of shims, each shim defining a thickness, at least one shim being disposable between a face of the mounting hub and a face of the external idler housing for shifting the external idler housing away from the mounting hub equal to a distance of the thickness of the at least one shim disposed between the face of the mounting hub and the face of the idler housing.

7. The adjustable idler of claim 6 wherein each of the shims has a different thickness.

8. The adjustable idler of claim 6 wherein two or more shims are stacked upon each other and disposed between the face of the mounting hub and the face of the idler housing for shifting the idler housing away from the mounting hub equal to a distance of a sum of the thicknesses of the stacked shims.

9. The adjustable idler of claim 1 wherein the plurality of holes in the mounting hub are threaded.

10. A method of adjusting an axial position of an idler mounted to a shaft of an automobile, the method comprising steps of:

providing a mounting hub to the shaft;

setting an idler housing over the mounting hub to a first axial position or a second axial position of a plurality of axial positions wherein the setting step comprises engaging a thread of the idler housing to a thread of the mounting hub until the idler housing has reached a desired axial position on the mounting hub; and fixedly attaching the idler housing to the mounting hub to fix the idler housing to the mounting hub at the first or second axial position performed during the setting step.

11. The method of claim 10 wherein the setting step comprises disposing a shim between a face of the idler housing and a face of the mounting hub to axially position the idler housing to the mounting hub.

12. The method of claim 10 wherein the fixedly attaching step comprises a step of bolting the idler housing to the mounting hub.

* * * * *